(12) United States Patent
Zhao et al.

(10) Patent No.: US 10,909,716 B2
(45) Date of Patent: Feb. 2, 2021

(54) VEHICLE LOCALIZATION USING MARKER DEVICES

(71) Applicant: Toyota Jidosha Kabushiki Kaisha, Toyota (JP)

(72) Inventors: Yecheng Zhao, Blacksburg, VA (US); BaekGyu Kim, Cupertino, CA (US)

(73) Assignee: TOYOTA JIDOSHA KABUSHIKI KAISH, Toyota (JP)

( * ) Notice: Subject to any disclaimer, the term of this patent is extended or adjusted under 35 U.S.C. 154(b) by 67 days.

(21) Appl. No.: 16/283,401

(22) Filed: Feb. 22, 2019

(65) Prior Publication Data
US 2020/0273197 A1 Aug. 27, 2020

(51) Int. Cl.
*G06T 7/70* (2017.01)
*G05D 1/02* (2020.01)

(52) U.S. Cl.
CPC ............ *G06T 7/70* (2017.01); *G05D 1/0234* (2013.01); *G05D 2201/0213* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,224,500 B2 | 7/2012 | Anderson | |
| 9,194,949 B2 | 11/2015 | Becker et al. | |
| 2006/0020389 A1* | 1/2006 | Yamamoto | G01C 21/26 701/494 |
| 2008/0033645 A1 | 2/2008 | Levinson et al. | |
| 2013/0046456 A1* | 2/2013 | Scofield | G01C 21/3453 701/117 |
| 2014/0085112 A1* | 3/2014 | Gruteser | B60Q 9/004 340/932.2 |
| 2018/0368081 A1* | 12/2018 | Akkarakaran | H04W 52/242 |
| 2019/0098468 A1* | 3/2019 | Yamamoto | H04W 4/029 |
| 2019/0122546 A1* | 4/2019 | Lu | G08G 1/0112 |
| 2019/0141644 A1* | 5/2019 | Ozturk | H04W 52/34 |
| 2020/0120619 A1* | 4/2020 | Manolakos | H04W 52/325 |

OTHER PUBLICATIONS

Bonsor et al., "How RFID Works," retrieved from https://electronics.howstuffworks.com/gadgets/high-tech-gadgets/rfid2.htm on Nov. 27, 2018, 5 pgs.

* cited by examiner

*Primary Examiner* — Mohammed Rachedine
(74) *Attorney, Agent, or Firm* — VLP Law Group LLP; Michel Bohn

(57) ABSTRACT

In an example, a method may read, at a first timestamp using a first reader device and a second reader device of a first vehicle, a first marker position from a first marker device located on a road segment at the first marker position and a second marker position from a second marker device located on the road segment at the second marker position that is different from the first marker position. The method may determine a vehicle position of the first vehicle on the road segment at the first timestamp based on the first marker position of the first marker device and the second marker position of the second marker device.

25 Claims, 12 Drawing Sheets

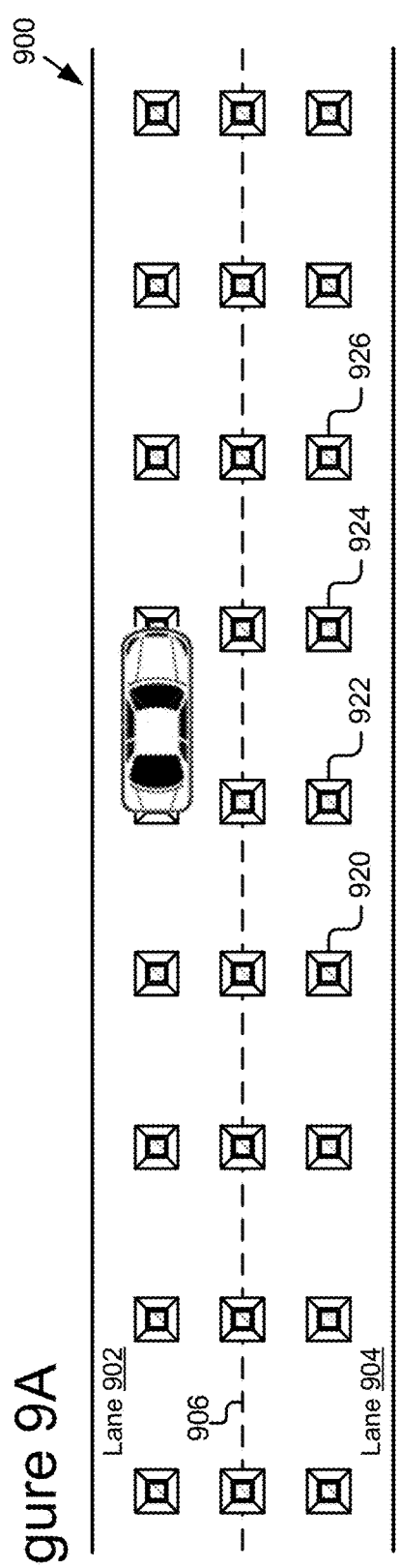
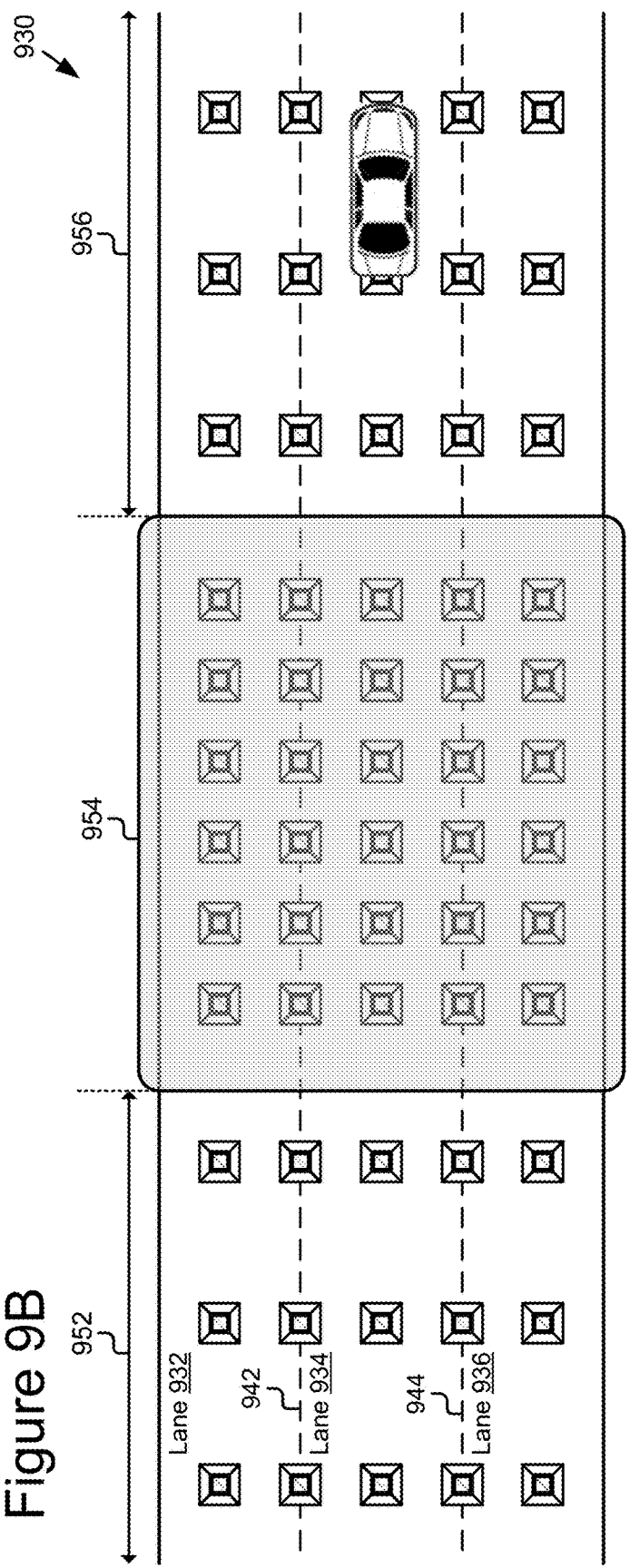
Figure 9A
Figure 9B

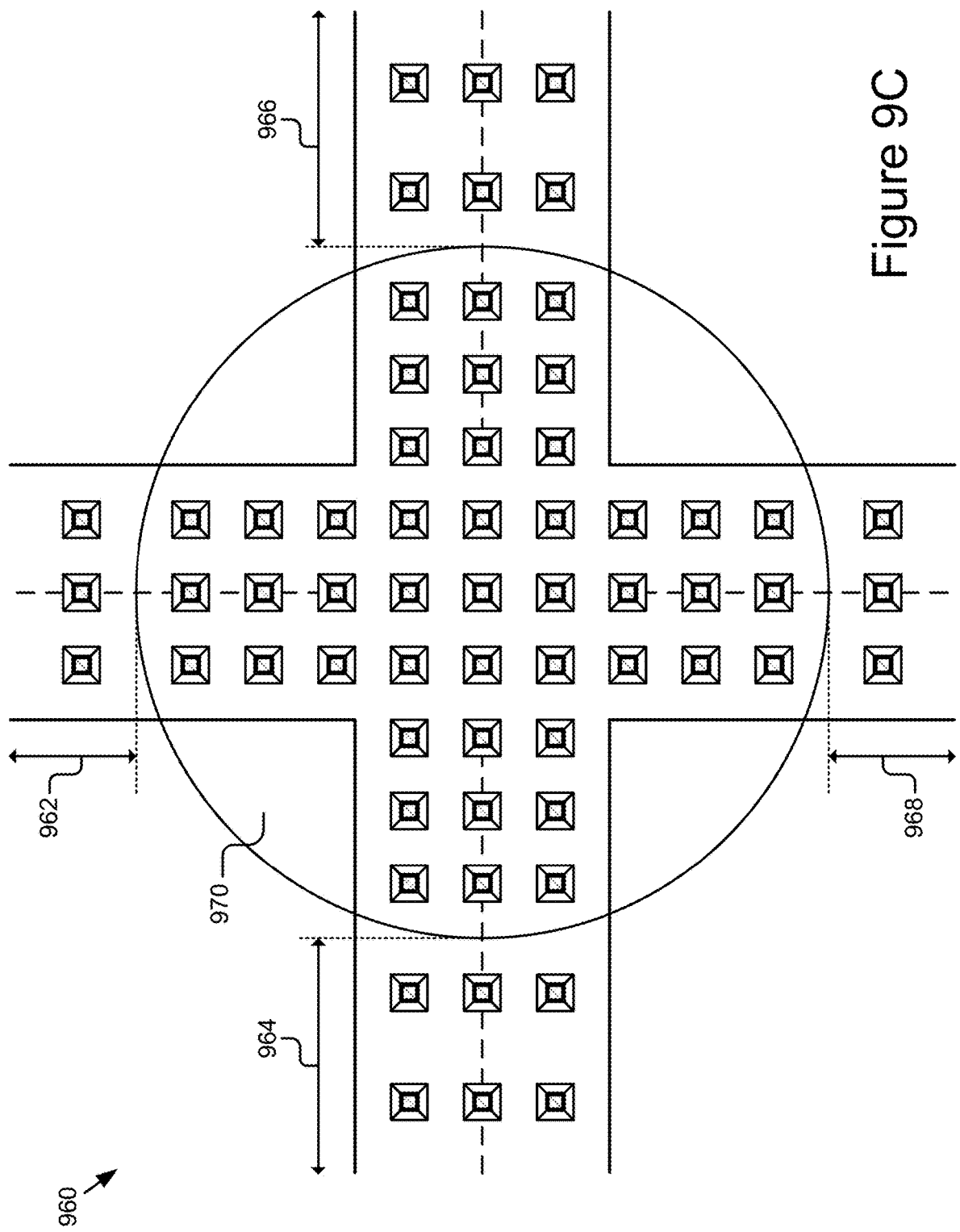

VEHICLE LOCALIZATION USING MARKER DEVICES

BACKGROUND

The present disclosure relates to vehicle localization. In a more particular example, the disclosure relates to technologies for localizing vehicles on the roads using marker devices.

Modern vehicles often implement critical applications related to vehicle safety and the operation of these critical applications often requires vehicle positions of the vehicles present on the roads. However, it is challenging to determine the accurate vehicle positions of the vehicles in real-time. Today, some modern vehicles rely on Global Positioning System (GPS) sensors to determine the vehicle positions. However, the vehicle positions determined by the GPS sensors are usually unreliable to be used for the critical vehicle applications because of their limited accuracy and relatively high latency. In addition, the operation of the GPS sensors is also highly susceptible to reflection and obstruction caused by various objects (e.g., buildings, tunnels, ground surface, etc.), and thus the vehicle localization using the GPS sensors are usually inaccurate or even unavailable in many situations.

Another existing solution for determining the vehicle positions is to detect a landmark located proximate to the vehicle and infer the vehicle position of the vehicle based on the landmark. However, this existing solution is usually inapplicable to localize the vehicles in many areas that do not include a landmark (e.g., remote areas, rural areas, etc.), and even in the areas that include a landmark, such vehicle localization is often inaccurate because the landmark detection and the estimation of the vehicle position relative to the detected landmark are highly susceptible to errors. Another existing solution is to compare the sensor data collected by the vehicle sensors to a map having a high resolution to determine the relative position of the vehicle in the map. However, the sensor data collected by the vehicle sensors may be subjected to negative impacts caused by the surrounding environment (e.g., obstructions, interference, etc.), and the comparison of the sensor data to the high-resolution map also often requires complicated computation and only results in a matching probability. As a result, the vehicle localization performed using this approach is usually inaccurate and computationally expensive. In addition, this existing approach is generally impractical or even inoperable when the high-resolution map of the area is not available.

SUMMARY

The subject matter described in this disclosure overcomes the deficiencies and limitations of the existing solutions by providing novel technology for localizing vehicles using marker devices.

According to one innovative aspect of the subject matter described in this disclosure, a computer-implemented method comprises: reading, at a first timestamp using a first reader device and a second reader device of a first vehicle, a first marker position from a first marker device located on a road segment at the first marker position and a second marker position from a second marker device located on the road segment at the second marker position that is different from the first marker position; and determining a vehicle position of the first vehicle on the road segment at the first timestamp based on the first marker position of the first marker device and the second marker position of the second marker device.

In general, another innovative aspect of the subject matter described in this disclosure may be embodied in computer-implemented methods comprising: receiving first detection data specifying a first set of marker devices among a plurality of marker devices located on a road segment, the first set of marker devices being read by reader devices of a plurality of first vehicles over a first time window; receiving second detection data specifying a second set of marker devices among the plurality of marker devices, the second set of marker devices being read by reader devices of a plurality of second vehicles over a second time window; determining, based on the first detection data and the second detection data, that a first marker device among the plurality of marker devices is faulty, the first marker device being located proximate to a second marker device included in one or more of the first set of marker devices and the second set of marker devices; and providing a maintenance operation to the first marker device.

In general, another innovative aspect of the subject matter described in this disclosure may be embodied in computer-implemented methods comprising: embedding a plurality of marker devices along a road segment; determining a marker position on the road segment for each marker device among the plurality of marker devices; writing, using a writer device, the marker position of each marker device among the plurality of marker devices to a non-transitory memory of that marker device; reading, using one or more reader devices of a vehicle, at least two marker positions from at least two marker devices among the plurality of marker devices; and determining a vehicle position of the vehicle on the road segment based on the at least two marker positions of the at least two marker devices among the plurality of marker devices.

In general, another innovative aspect of the subject matter described in this disclosure may be embodied in systems comprising: one or more processors; one or more memories storing instructions that, when executed by the one or more processors, cause the system to: read, at a first timestamp using a first reader device and a second reader device of a first vehicle, a first marker position from a first marker device located on a road segment at the first marker position and a second marker position from a second marker device located on the road segment at the second marker position that is different from the first marker position; and determine a vehicle position of the first vehicle on the road segment at the first timestamp based on the first marker position of the first marker device and the second marker position of the second marker device.

These and other implementations may each optionally include one or more of the following features: that determining the vehicle position of the first vehicle on the road segment at the first timestamp includes determining, based on a combination of at least the first marker position of the first marker device and the second marker position of the second marker device, the vehicle position of the first vehicle relative to the first marker device and the second marker device on the road segment; that determining the vehicle position of the first vehicle on the road segment at the first timestamp includes determining the vehicle position of the first vehicle relative to the first marker device and the second marker device on the road segment based on the first marker position of the first marker device, a first reader position of the first reader device that read the first marker device, the second marker position of the second marker device, and a second reader position of the second reader device that read the second marker device; that determining that no marker device was read at a second timestamp by the first reader device and the second reader device of the first vehicle, the second timestamp being subsequent to the first timestamp, responsive to determining that no marker device was read by the first reader device and the second reader device of the first vehicle at the second timestamp, determining vehicle movement data of the first vehicle during a time window between the first timestamp and the second timestamp, and determining a vehicle position of the first vehicle at the second timestamp based on the vehicle position of the first vehicle at the first timestamp and the vehicle movement data of the first vehicle during the time window; that reading, using the first reader device of the first vehicle, context data from the first marker device, the context data including one or more roadway attributes of a roadway portion of the road segment that is adjacent to the first marker device, and controlling, using a control unit of the first vehicle, a vehicle operation of the first vehicle based on the one or more roadway attributes of the roadway portion of the road segment; that the one or more roadway attributes of the roadway portion of the road segment include one or more of a roadway type of the roadway portion, a speed limit of the roadway portion, a lane number and one or more lane attributes of one or more traffic lanes associated with the first marker device in the roadway portion, and a roadway type of an upcoming roadway portion that follows the roadway portion, and the vehicle operation of the first vehicle includes one or more of a path planning operation, a vehicle light adjustment, a vehicle speed adjustment, and a steering angle adjustment of the first vehicle; that updating, using a writer device of the first vehicle, one or more of the first marker position of the first marker device and context data stored in the first marker device; that a first sensing area of the first reader device overlaps with a second sensing area of the second reader device; that receiving detection data specifying a set of marker devices among a plurality of marker devices located on the road segment, the set of marker devices being read by reader devices of a plurality of vehicles over a time window, determining, based on the detection data, that a third marker device among the plurality of marker devices was unread by the reader devices of the plurality of vehicles, the third marker device being located proximate to a fourth marker device included in the set of marker devices, and determining that the third marker device is faulty.

These and other implementations may each optionally include one or more of the following features: that determining that the first marker device is faulty includes determining, based on the first detection data associated with the plurality of first vehicles, a first detection count of the first marker device over the first time window, determining, based on the second detection data associated with the plurality of second vehicles, a second detection count of the first marker device over the second time window, determining that a count difference between the first detection count of the first marker device over the first time window and the second detection count of the first marker device over the second time window satisfies a count difference threshold, and responsive to determining that the count difference between the first detection count of the first marker device over the first time window and the second detection count of the first marker device over the second time window satisfies the count difference threshold, determining that the first marker device is faulty; that determining that the first marker device is faulty includes determining, based on the first detection data associated with the plurality of first vehicles, a first conditional probability associated with the first marker device, determining, based on the second detection data associated with the plurality of second vehicles, a second conditional probability associated with the first marker device, determining that a probability difference between the first conditional probability associated with the first marker device and the second conditional probability associated with the first marker device satisfies a probability difference threshold, and responsive to determining that the probability difference between the first conditional probability associated with the first marker device and the second conditional probability associated with the first marker device satisfies the probability difference threshold, determining that the first marker device is faulty; that the first conditional probability associated with the first marker device indicates a probability that the first marker device was read by reader devices of a first vehicle among the plurality of first vehicles given that one or more proximate marker devices located proximate to the first marker device on the road segment were read by the reader devices of the first vehicle, the one or more proximate marker devices including the second marker device, and the second conditional probability associated with the first marker device indicates a probability that the first marker device was read by reader devices of a second vehicle among the plurality of second vehicles given that the one or more proximate marker devices were read by the reader devices of the second vehicle; that generating a simulated road segment simulating a traffic condition of the road segment, generating simulated detection data using the simulated road segment, and determining that the first marker device located on the road segment is faulty based on the simulated detection data and the second detection data associated with the plurality of second vehicles; that determining a vehicle position of a third vehicle on the road segment at a first timestamp, reading, at a second timestamp using a reader device of the third vehicle, a marker position from the first marker device located on the road segment, determining an expected vehicle position of the third vehicle at the second timestamp based on the vehicle position of the third vehicle at the first timestamp and vehicle movement data of the third vehicle during a time window between the first timestamp and the second timestamp, determining that a position difference between the expected vehicle position of the third vehicle at the second timestamp and the marker position of the first marker device being read at the second timestamp by the reader device of the third vehicle satisfies a position difference threshold, and responsive to determining that the position difference between the expected vehicle position of the third vehicle at the second timestamp and the marker position of the first marker device being read at the second timestamp by the reader device of the third vehicle satisfies the position difference threshold, determining that the first marker device is faulty.

These and other implementations may each optionally include one or more of the following features: that embedding the plurality of marker devices along the road segment includes embedding a first set of marker devices within a first lane of the road segment and a second set of marker devices within a second lane of the road segment, and embedding a third set of marker devices on a lane boundary between the first lane and the second lane; that determining an accident risk metric of the road segment, and determining a placement density of the plurality of marker devices along the road segment based on the accident risk metric of the road segment; that the road segment includes one or more of a tunnel road segment, an underpass road segment, a curvy road segment, and an intersection area.

Other implementations of one or more of these and other aspects include corresponding systems, apparatus, and computer programs, configured to perform the actions of methods, encoded on non-transitory computer storage devices.

The novel technology for determining the vehicle positions of the vehicles presented in this disclosure is particularly advantageous in a number of respects. For example, the technology described herein can read the marker positions from the marker devices located on the road segment, and localize the vehicle based on the marker positions of the marker devices. Thus, the present technology does not require a massive amount of computation to determine the vehicle position of the vehicle as compared to other localization techniques (e.g., map matching, object detection, etc.). As a result, the latency for determining the vehicle position of the vehicle can be significantly reduced and the present technology is therefore advantageously applicable to various real-time vehicle applications. In addition, the present technology can accurately determine the vehicle position of the vehicle on the road segment without relying on the sensor data collected by the vehicle sensors (e.g., GPS sensors, image sensors, etc.), and thus the negative impacts of the surrounding environment on the operations of the vehicle sensors (e.g., obstruction, reflection, interference, etc., caused by obstacles, weather condition, lighting condition, etc.) may not affect the accuracy of the vehicle localization.

As a further example, the technology described herein can determine the vehicle position of the vehicle on the road segment based on the marker positions of multiple marker devices, thereby improving the accuracy of the vehicle position of the vehicle. In addition to the marker position, the present technology can also read the context data from the marker device, and adapt the vehicle operation of the vehicle based on the context data. As the context data may describe the roadway portion of the road segment that is adjacent to the marker device (e.g., lane number, roadway structure, etc.), reading the context data from the marker device located on the road segment is advantageous, especially in adverse driving conditions that cause limited vision to the driver (e.g., driving in a tunnel, driving in snowstorm, etc.). The technology described herein can also efficiently identify faulty marker devices among multiple marker devices located on various road segments, and thus effectively facilitate the maintenance of the marker devices.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIGS. 9A-9C illustrate example marker placement patterns of the marker devices on road segments.

DESCRIPTION

Figure 1:
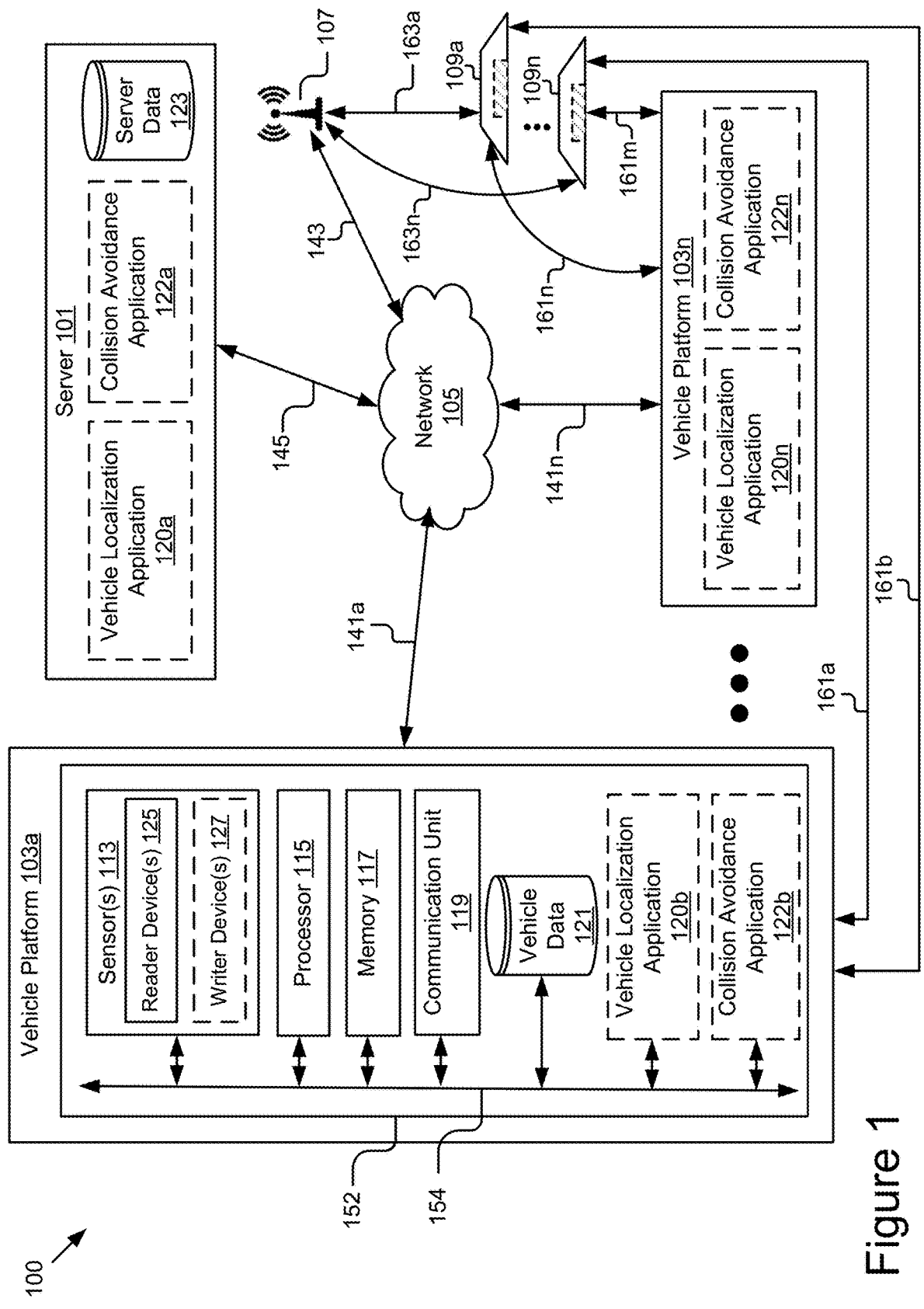
FIG. 1 is a block diagram of an example system for localizing vehicles.

The technology described herein can accurately determine the positions of vehicles on the road segments using marker devices. As described in further detail below, the technology includes various aspects, such as vehicle localization methods, systems, computing devices, computer program products, and apparatuses, among other aspects.

An example vehicle localization system may read a first marker position from a first marker device located on a road segment at the first marker position. The vehicle localization system may read the first marker device at a first timestamp using a first reader device of a first vehicle. The vehicle localization system may also read a second marker position from a second marker device located on the road segment at the second marker position. The vehicle localization system may read the second marker device at the first timestamp using a second reader device of the first vehicle. The vehicle localization system may determine the vehicle position of the first vehicle on the road segment at the first timestamp based on first marker position of the first marker device and the second marker position of the second marker device.

By way of further example, in important applications, such as autonomous intersection management and highway ramp merging, a central agent, such as a roadside server, is often deployed at the intersection/merge-ramp and is responsible for orchestrating and instructing involved vehicles to smoothly and safely operate through the intersection and merging process. Generally, the central agent can compute the optimal (e.g., with respect to time and fuel efficiency) non-colliding trajectory for involved vehicles based on their initial positions, speeds etc., and then instruct them to follow in real-time.

Real-time and accurate vehicle localization is generally a critical requirement in these applications. For example, first, the central agent needs to process the accurate initial positions of the involved vehicles in order to compute the optimal and safe trajectories. Second, after the trajectory is assigned to a vehicle, the vehicle computer needs to continuously process its accurate position in real-time so as to ensure that the trajectory is being followed.

Traditional solutions, such as GPS, fall well short of both accuracy and latency for these applications. The innovative technology disclosed herein provides a more reliable way to address these issues. Specifically, with respect to these non-limiting applications, a set of position marker devices can be placed around the intersection and highway merge ramp, which allows on-road vehicles to accurately determine their position. The position information is then transmitted to the managing agent (e.g., roadside server via V2I communication) to facilitate the computation of a suitable trajectory. After the trajectory is assigned to the vehicle, the vehicle continues to use the position it determines from marker devices in real-time to accurately follow the trajectory.

FIG. 1 is a block diagram of an example system 100 for localizing vehicles on road segments. As shown, the system 100 includes a server 101, one or more vehicle platforms 103a . . . 103n, and one or more roadside unit 107a . . . 107n coupled for electronic communication via a network 105. The system 100 may also include one or more marker devices 109a . . . 109n communicatively coupled to the roadside unit 107a . . . 107n, the marker devices 109a . . . 109n may also be communicatively coupled to the vehicle platforms 103a . . . 103n that are temporarily located adjacent to the marker devices 109a . . . 109n as these vehicle platforms 103a . . . 103n travel along the road segment. In FIG. 1 and the remaining figures, a letter after a reference number, e.g., "103a", represents a reference to the element having that particular reference number. A reference number in the text without a following letter, e.g., "103", represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, roadside units 107, marker devices 109, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near-field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. Although FIG. 1 illustrates a single block for the network 105 that couples to the server 101, the vehicle platform(s) 103, and the roadside units 107, it should be understood that the network 105 may in practice comprise any number of combination of networks, as noted above.

The roadside unit(s) 107 may be a hardware and/or virtual server that includes a processor, a memory, and network communication capabilities (e.g., a communication unit). The roadside unit(s) 107 may be communicatively coupled to the network 105, as reflected by signal lines 143. In some embodiments, the roadside unit 107(s) may be an infrastructure located on the roadside of the road segment. In some embodiments, the roadside unit 107 may be configured to transmit data to and/or receive data from the marker device(s) 109 located on the road segment, as reflected by signal lines 163. The roadside unit 107 may also be configured to transmit data to and/or receive data from the vehicle platform(s) 103 traveling on the road segment via the network 105. In some embodiments, the roadside unit 107 may transmit the data received from the marker device(s) 109 and/or the vehicle platform(s) 103 to other entities of the system 100 (e.g., other roadside unit(s) 107 and/or the server 101).

The marker device(s) 109 may be a device that includes a protection container, and a storage unit including a non-transitory memory and communication capabilities (e.g., a communication component). In some embodiments, the marker device(s) 109 may be embedded along the road segment and may be communicatively coupled to the roadside unit(s) 107 of the road segment via the signal lines 163. The marker device(s) 109 may also transmit data to and/or receive data from the vehicle platform(s) 103, as reflected by signal lines 161. In some embodiments, to transmit data to the vehicle platform 103, the marker device 109 may need to be within the sensing area of a reader device 125 mounted on the vehicle platform 103, and thus the reader device 125 of the vehicle platform 103 can read the marker data stored in the storage unit of the marker device 109 via the signal line 161. In some embodiments, to receive data from the vehicle platform 103, the marker device 109 may need to be within the sensing area of a writer device 127 mounted on the vehicle platform 103, and thus the writer device 127 of the vehicle platform 103 can write the marker data to the storage unit of the marker device 109 via the signal line 161. The marker device(s) 109 may be referred to herein as roadway marker device(s).

The vehicle platform(s) 103 include computing device(s) 152 having sensor(s) 113, processor(s) 115, memory(ies) 117, communication unit(s) 119, a vehicle data store 121, a vehicle localization application 120, and a collision avoidance application 122. Examples of computing device(s) 152 may include virtual or physical computer processors, control units, micro-controllers, etc., which are coupled to other components of the vehicle platform(s) 103, such as one or more sensors 113, one or more actuators, one or more motivators, etc. The vehicle platform(s) 103 may be coupled to the network 105 via signal line 141, and may send and receive data to and from other vehicle platform(s) 103, the roadside unit(s) 107, the server(s) 101, and/or the marker device(s) 109. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory, or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data as vehicle operation data in the vehicle data store 121 for access and/or retrieval by the vehicle localization application 120, the collision avoidance application 122, and/or other vehicle applications. In some implementations, the processor(s) 115 may be capable of controlling various actuators, motivators, and/or other components of the vehicle platform 113 (e.g., steering actuators, speed actuators, vehicle brake, vehicle lighting system, etc.). The processor(s) 115 may also be capable of generating and providing electronic display signals to input/output device(s), capturing and transmitting images, performing complex tasks including various types of detection data analysis and vehicle localization, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or the vehicle data store 121.

Figure 2:
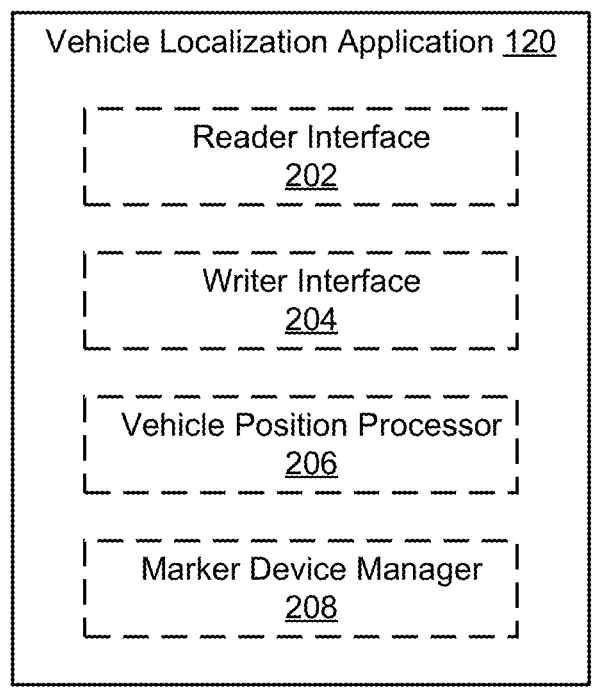
FIG. 2 is a block diagram of an example vehicle localization application.

The vehicle localization application 120 includes software and/or hardware logic executable to determine vehicle positions of vehicles on road segments. As illustrated in FIG. 1, the server 101 and the vehicle platform 103a . . . 103n may include instances 120a and 120b 120n of the vehicle localization application 120. In some embodiments, each instance 120a and 120b 120n may comprise one or more components as depicted in FIG. 2, and may be configured to fully or partially perform the functionalities described herein depending on where the instance resides. In some embodiments, the vehicle localization application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The vehicle localization application 120 may receive and process the sensor data and/or the vehicle data, and communicate with other elements of the vehicle platform 103 via the bus 154, such as the communication unit 119, the memory 117, the vehicle data store 121, the collision avoidance application 122, etc. The vehicle localization application 120 is described in details below with reference to at least FIGS. 2-9C.

The collision avoidance application 122 is computer logic executable to avoid collision between the vehicle platform 103 and other vehicle platforms 103. As illustrated in FIG. 1, the server 101 and the vehicle platform 103a . . . 103n may include instances 122a and 122b . . . 122n of the collision avoidance application 122. In some embodiments, the collision avoidance application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. It should be understood that in addition to the collision avoidance application 122, the vehicle platform 103 may also include other vehicle applications (e.g., vehicle platoon application, road scene modeling application, etc.) that may use the vehicle positions of the vehicle platforms 103 determined by the vehicle localization application 120 to perform their operations.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the vehicle localization application 120, the collision avoidance application 122, and/or other vehicle applications. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other entities of the system 100, such as other vehicle platform(s) 103, roadside unit(s) 107, and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors and/or image sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photosensors, gyroscopes, accelerometers, speedometers, steering sensors, braking sensors, switches, vehicle indicator sensors, windshield wiper sensors, geolocation sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more reader devices 125 mounted on the vehicle platform 103, each reader device 125 may be uniquely identified by a reader device identifier (ID). In some embodiments, the reader device 125 may be installed at a reader position on the bottom of the vehicle platform 103 and capable of reading data from the marker device(s) 109 embedded on or under the roadway surface of the road segment. In some embodiments, in order for the reader device 125 to perform a read operation on the marker device 109 located on the road segment, the vehicle platform 103 on which the reader device 125 is mounted may be at a vehicle position proximate to the marker device 109 so that the marker device 109 lies within the sensing area of the reader device 125. Thus, the reader device 125 may detect the marker device 109 present within its sensing area (e.g., using electromagnetic signal), and read the marker data from the storage unit of the marker device 109 via the signal line 161. Other reader position of the reader device 125 on the vehicle platform 103 are also possible and contemplated.

In some embodiments, the sensor(s) 113 may optionally include one or more writer devices 127 mounted on the vehicle platform 103, each writer device 127 may be uniquely identified by a writer device ID. Similar to the reader device 125, the writer device 127 be installed at a writer position on the bottom of the vehicle platform 103 and capable of writing data to the marker device(s) 109 embedded on or under the roadway surface of the road segment. In some embodiments, in order for the writer device 127 to perform a write operation on the marker device 109 located on the road segment, the vehicle platform 103 on which the writer device 127 is mounted may be at a vehicle position proximate to the marker device 109 so that the marker device 109 lies within the sensing area of the writer device 127. Thus, the writer device 127 may detect the marker device 109 present within its sensing area (e.g., using electromagnetic signal), and write and/or update the marker data in the storage unit of the marker device 109 via the signal line 161. Other writer position of the writer device 127 on the vehicle platform 103 are also possible and contemplated.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, wheel speed (Revolutions Per Minute—RPM), steering angle, braking force, etc. In some embodiments, the vehicle data may also include a vehicle ID uniquely identifying the vehicle platform 103 (e.g., Vehicle Identification Number (VIN)).

In some embodiments, the vehicle data may include vehicle movement data describing the vehicle movement of the vehicle platform 103. The vehicle movement data of the vehicle platform 103 may include the vehicle route currently followed by the vehicle platform 103 to get to a destination, the vehicle speed, the vehicle acceleration/deceleration rate, the vehicle orientation, the steering angle, the moving direction, etc., of the vehicle platform 103. Other types of vehicle movement data are also possible and contemplated.

In some embodiments, the vehicle data store 121 may store read data describing one or more read operations performed by the reader devices 125 of the vehicle platform 103. In some embodiments, for a read operation performed by a reader device 125 of the vehicle platform 103 on marker device 109, the read data may include the reader device ID of the reader device 125, the reading timestamp of the reading cycle during which the reader device 125 read the marker device 109, the marker data of the marker device 109 that the reader device 125 obtained from the storage unit of the marker device 109, etc. In some embodiments, the marker data of the marker device 109 may include the marker identifier (ID) uniquely identifying the marker device 109, the marker position at which the marker device 109 is located on the road segment, the context data describing the roadway portion of the road segment that is adjacent to the marker device 109, etc. Other types of read data are also possible and contemplated.

In some embodiments, the vehicle data store 121 may also store detection data specifying one or more marker devices 109 located on various road segments that were sequentially detected and read by the reader devices 125 of the vehicle platform 103 as the vehicle platform 103 traveled along these road segments. In some embodiments, for a marker device 109 that was read on a road segment by a reader device 125 of the vehicle platform 103, the detection data may specify the road segment, the marker ID of the marker device 109, the reading timestamp of the reading cycle during which the reader device 125 read the marker device 109, etc. Other types of detection data are also possible and contemplated.

In some embodiments, the vehicle data store 121 may store reader device description describing one or more reader devices 125 of the vehicle platform 103. In some embodiments, for a reader device 125, the reader device description may specify the reader device ID of the reader device 125, the reader position at which the reader device 125 is mounted on the vehicle platform 103, the sensing area within which the reader device 125 can perform the read operation on the marker devices 109 (e.g., geometric shape, size, etc.), etc. Other types of reader device description are also possible and contemplated. In some embodiments, the vehicle data store 121 may also store writer device description describing one or more writer devices 127 of the vehicle platform 103. In some embodiments, for a writer device 127, the writer device description may specify the writer device ID of the writer device 127, the writer position at which the writer device 127 is mounted on the vehicle platform 103, the sensing area of the writer device 127 (e.g., geometric shape, size, etc.), etc. Other types of writer device description are also possible and contemplated In some embodiments, the vehicle data store 121 may be part of a data storage system (e.g., a standard data or database management system) for storing and providing access to data. Other types of data stored in the vehicle data store 121 are also possible and contemplated.

The server 101 may be a hardware and/or virtual server that includes a processor, a memory, and network communication capabilities (e.g., a communication unit). In some embodiments, the server 101 may be a computing server located remotely from the road segments on which the vehicle platforms 103 travel. For example, the server 101 may be a cloud server residing in a data center. The server 101 may be communicatively coupled to the network 105, as reflected by signal line 145. In some embodiments, the server 101 may send and receive data to and from other entities of the system 100 (e.g., the vehicle platform(s) 103 and/or the roadside unit(s) 107) via the network 105. As depicted, the server 101 may include an instance 120*a* of the vehicle localization application 120, an instance 122*a* of the collision avoidance application 122, and a server data store 123 that stores various types of data for access and/or retrieval by these applications.

In some embodiments, the server data store 123 includes a non-transitory storage medium that stores marker data of multiple marker devices 109 located on various road segments. As discussed elsewhere herein, for a marker device 109 located on a road segment, the marker data may specify the road segment on which the marker device 109 is located, the marker ID, the marker position, the context data, etc., associated with the marker device 109. In some embodiments, the server data store 123 may also store detection data of multiple vehicle platforms 103. As discussed elsewhere herein, for a vehicle platform 103, the detection data may specify multiple marker devices 109 located on various road segments that were sequentially detected and read by the reader devices 125 of the vehicle platform 103 as the vehicle platform 103 traveled along these road segments. In some embodiments, for a marker device 109 that was read on a road segment by a reader device 125 of the vehicle platform 103, the detection data may specify the road segment, the marker ID of marker device 109, the reading timestamp of the reading cycle during which the reader device 125 of the vehicle platform 103 read the marker device 109, etc. In some embodiments, the detection data of the vehicle platform 103 stored in the server data store 123 of the server 101 may be the same as detection data of the vehicle platform 103 stored in the vehicle data store 121 of the corresponding vehicle platform 103. In some embodiments, the server data store 123 may also store map data describing geographical maps of various road segments.

In some embodiments, the server data store 123 may be part of a data storage system (e.g., a standard data or database management system) for storing and providing access to data. Other types of data stored in the server data store 123 are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

FIG. 2 is a block diagram of an example vehicle localization application 120. As depicted, the vehicle localization application 120 may include a reader interface 202, a writer interface 204, a vehicle position processor 206, and a marker device manager 208. It should be understood that the vehicle localization application 120 may include additional components such as, but not limited to, a configuration engine, an encryption/decryption engine, etc., and/or these various components may be combined into a single engine or divided into additional engines. In some embodiments, the vehicle localization application 120 may be implemented in various computing entities of the system 100 and may be configured based on the computing entity in which it is implemented. In some embodiments, the vehicle localization application 120 may be implemented in the server 101, and optionally configured to enable the vehicle position processor 206, the marker device manager 208, and disable other components of the vehicle localization application 120. In some embodiments, the vehicle localization application 120 may be implemented in the roadside unit 107, and optionally configured to enable the writer interface 204, the vehicle position processor 206, the marker device manager 208, and disable other components of the vehicle localization application 120. In some embodiments, the vehicle localization application 120 may be implemented in the vehicle platform 103, and optionally configured to enable the reader interface 202, the writer interface 204, the vehicle position processor 206, and the marker device manager 208 of the vehicle localization application 120. Other configurations of the vehicle localization application 120 are also possible and contemplated.

The reader interface 202, the writer interface 204, the vehicle position processor 206, and the marker device manager 208 may be implemented as software, hardware, or a combination of the foregoing. In some embodiments, the reader interface 202, the writer interface 204, the vehicle position processor 206, and the marker device manager 208 may be communicatively coupled by the bus 154 and/or the processor 115 to one another and/or to the other components of the computing device 152. In some embodiments, one or more of the components 120, 202, 204, 206, and/or 208 are sets of instructions executable by the processor 115 to provide their functionality. In further embodiments, one or more of the components 120, 202, 204, 206, and/or 208 are storable in the memory 117 and are accessible and executable by the processor 115 to provide their functionality. In any of the foregoing embodiments, these components 120, 202, 204, 206, and/or 208 may be adapted for cooperation and communication with the processor 115 and other components of the computing device 152. The vehicle localization application 120 and its components 202, 204, 206, 208 are described in further detail below with reference to at least FIGS. 3-9C.

Figure 7A:
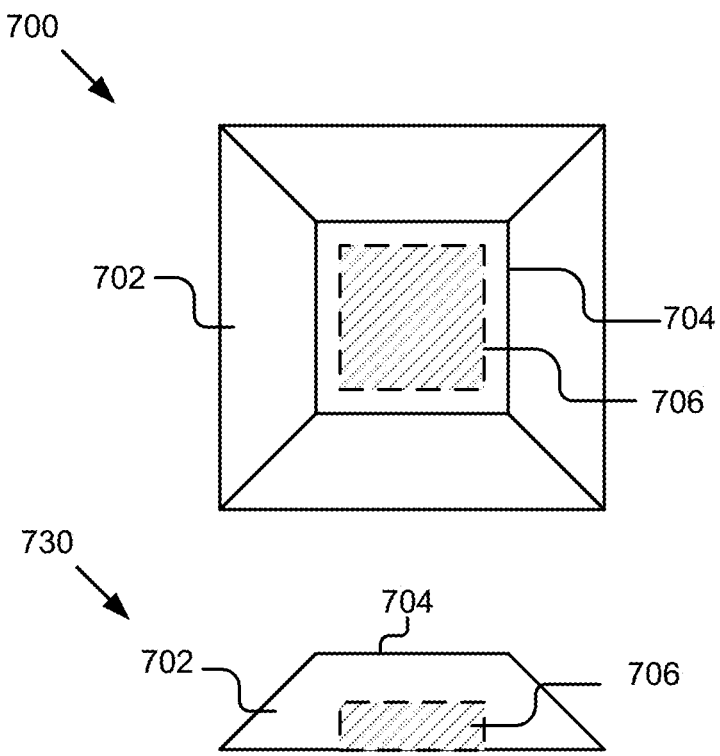
FIG. 7A illustrates an example marker device.

As discussed elsewhere herein, the vehicle localization application 120 is computer logic executable to determine the vehicle position of the vehicle platform 103 based on one or more marker devices 109 located on the road segment. An example marker device 109 is depicted in FIG. 7A. As shown, FIG. 7A illustrates a top-view diagram 700 and a front-view diagram 730 of the marker device 109. As depicted, the marker device 109 may include a protection container 702 and a storage unit 706 placed inside the protection container 702.

In some embodiments, the protection container 702 of the marker device 109 may be a container securely installed on or under the roadway surface of the road segment and contain the storage unit 706 therein. Thus, the protection container 702 can keep the storage unit 706 at a particular position on the road segment. As depicted in FIG. 7A, the protection container 702 may have a substantially flat shape and a relatively small size (e.g., 10 cm×10 cm) to minimize the impact of the marker device 109 on the vehicle movement of the vehicle platforms 103 as these vehicle platforms 103 move on the roadway surface of the road segment, although other larger, smaller, taller, thinner, etc., variations are also possible.

In some embodiments, the protection container 702 may be formed with a durable structure and highly resistant to various factors (e.g., rain, snow, temperature difference, applied pressure, frictional force, etc.). As a result, the protection container 702 can effectively protect the storage unit 706 from being damaged by the weather condition and/or by the vehicle movement of the vehicle platforms 103 on the roadway surface. In some embodiments, the protection container 702 may optionally include an openable element 704 (e.g., a portion of the top surface) that can be opened to place the storage unit 706 inside the protection container 702 and then securely closed to hold the storage unit 706 within the protection container 702.

In some embodiments, the storage unit 706 of the marker device 109 may be a storage device that has a relatively small size to fit within the protection container 702. In some embodiments, the storage unit 706 may include a non-transitory memory for storing data, a communication component (e.g., antenna), and/or a power source (e.g., battery).

In some embodiments, the data stored in the memory of the storage unit 706 can be read by the reader devices 125 that are compatible with the storage unit 706. To read the data stored in the memory of the storage unit 706, the reader device 125 may transmit an electromagnetic signal within its sensing area. Transmission of the signal may be continuously, repeated at consistent or random intervals, triggered by inputs (e.g., proximity), etc.

If the marker device 109 is located within the sensing area of the reader device 125, the communication component of the storage unit 706 may receive the electromagnetic signal from the reader device 125, and transmit the data stored in the memory of the storage unit 706 to the reader device 125 in the form of a response signal. In some embodiments, the storage unit 706 may be passively powered by the electromagnetic field of the reader device 125 instead of using its own power source. Non-limiting examples of the storage unit 706 include, but are not limited to, Radio Frequency Identification (RFID) tag, barcode, Quick Response (QR) code, etc. Any other suitable types of storage unit(s) 706 are also possible and contemplated.

In some embodiments, the memory of the storage unit 706 included in the marker device 109 may store the marker data of the marker device 109. The memory and the communication component of the storage unit 706 included in the marker device 109 may be referred to herein as the memory and the communication component of the marker device 109. As discussed elsewhere herein, the marker data of the marker device 109 may include the marker ID uniquely identifying the marker device 109, the marker position at which the marker device 109 is located on the road segment, the context data describing the roadway portion of the road segment that is adjacent to the marker device 109, etc. Other types of marker data are also possible and contemplated.

In some embodiments, the road workers (e.g., human and/or machinery) may embed a plurality of marker devices 109 along a road segment. In some embodiments, the road workers may install the marker devices 109 onto the roadway surface of the road segment using adhesive material, and thus the marker devices 109 may protrude above the roadway surface. As discussed above, the marker devices 109 may have a substantially flat shape and a relatively small size due to the shape and size of the protection container 702. As a result, the impact on the vehicle movement of the vehicle platform 103 caused by the marker devices 109 slightly raising above the roadway surface can be limited. However, it should be understood that other form factors are also possible and contemplated, such as flush embodiments, under-the-surface embodiments, etc.

In some embodiments, the marker devices 109 may be installed under the roadway surface of the road segment. As an example, the road workers may position the marker devices 109 in the asphalt of the roadway surface such that the openable element 704 of the protection container 702 may be exposed on the roadway surface without raising above the roadway surface of the road segment. This implementation is advantageous because the roadway surface of the road segment remains even and the impact of the marker devices 109 on the vehicle movement of the vehicle platform 103 can be avoided. In addition, as the protection container 702 is accessible from the roadway surface through the openable element 704 exposed on the roadway surface, the storage unit 706 can be conveniently placed into or taken out of the protection container 702 through the openable element 704 without the need to remove the marker device 109 from the asphalt. In this present disclosure, installing the marker devices 109 on or under the roadway surface along the road segment may be commonly referred to as embedding or placing the marker devices 109 on the road segment. Other implementations for installing the marker devices 109 along the road segment are also possible and contemplated.

In some embodiments, marker devices 109 may be placed on or in the road segment according to a marker placement pattern. Example marker placement patterns of the marker devices 109 are illustrated in FIGS. 9A-9C. FIG. 9A depicts a road segment 900 on which multiple marker devices 109 are placed evenly along the road segment 900. The road segment 900 may include a traffic lane 902, a traffic lane 904, and a lane boundary 906 between the traffic lane 902 and the traffic lane 904. As depicted, the road workers may place a first set of marker devices 109 within the traffic lane 902, a second set of marker devices 109 within the traffic lane 904, and a third set of marker devices 109 on the lane boundary 906. As shown, the first set of marker devices 109 and the second set of marker devices 109 may be placed relatively in the middle of the corresponding lane. This implementation is advantageous because it can reduce the likelihood of the marker devices 109 being under the vehicle wheels of the vehicle platforms 103, thereby reducing the likelihood of the marker devices 109 being damaged by these vehicles.

In some embodiments, the marker devices 109 may be placed on the road segment with sufficient placement density so that the vehicle platforms 103 can determine their vehicle position based on the marker devices 109 as frequently as needed, while unnecessary deployment cost due to implementing too many marker devices 109 on the road segment can be avoided. In some embodiments, the marker device manager 208 may determine the placement density of the marker devices 109 on the road segment. In some embodiments, the marker device manager 208 may determine the accident risk metric of the road segment based on the roadway structure, the average traffic flow, the driving condition, etc., of the road segment, and determine the placement density of the marker devices 109 on the road segment to be directly proportional to the accident risk metric of the road segment. In some embodiments, the marker device manager 208 may determine the quality metric of other localization techniques in the geographical area including the road segment, and determine the placement density of the marker devices 109 on the road segment to be inversely proportional to the quality metric of the other localization techniques (e.g., the availability and the strength of GPS signal).

As an example, on the road segments that have relatively high accident risk metric due to complicated roadway structure (e.g., interchange), high average traffic flow (e.g., urban intersection), dangerous driving condition (e.g., curvy canyon road that causes limited vision to the drivers), etc., and/or on the road segments that have limited availability or limited quality of other localization techniques (e.g., tunnel or underpass with unstable GPS signal), the vehicle platforms 103 may need to frequently update their vehicle positions based on the marker devices 109 on the road segment (e.g., every 100 ms). Therefore, the marker devices 109 may be placed on these road segments with the placement density that satisfies the first placement density threshold (e.g., more than 3 marker devices/m). On the other hand, on the road segments that have relatively low accident risk metric (straight highway with low average traffic flow), and/or on the road segments that have relatively high-quality metric of other localization techniques (e.g., rural road with strong GPS signal), the vehicle platforms 103 may not need to frequently update their vehicle positions based on the marker devices 109 on the road segment (e.g., every 3 s). Therefore, the marker devices 109 may be placed on these road segments with the placement density that satisfies the second placement density threshold (e.g., less than 1.5 marker device/m) or no marker device 109 may be placed on these road segments.

As discussed above, the marker devices 109 may be placed along tunnel road segments, underpass road segments, curvy road segments, intersection areas, etc., with a relatively high placement density. For example, FIG. 9B illustrates a road area 930 including a road segment 952, a road segment 954 inside a tunnel, and a road segment 956. As depicted, the placement density of the marker devices 109 on the road segment 954 may be higher than the placement density of the marker devices 109 on the road segment 952 and the placement density of the marker devices 109 on the road segment 956 due to higher risk of traffic accident and limited quality of other localization techniques inside the tunnel. As another example, FIG. 9C illustrates a road area 960 including a road segment 962, a road segment 964, a road segment 966, a road segment 968, and an intersection 970. As depicted, the placement density of the marker devices 109 in the intersection 970 may be higher than the placement density of the marker devices 109 on other road segments of the road area 960 due to a higher risk of a traffic accident at the intersection.

In some embodiments, once the plurality of marker devices 109 are embedded on the road segment, the marker device manager 208 may determine the marker data for the plurality of marker devices 109. For each marker device 109 among the plurality of marker devices 109, the marker device manager 208 may assign a unique marker ID to the marker device 109, and determine the marker position at which the marker device 109 is embedded on the road segment. In some embodiments, the marker device manager 208 may determine the marker position of the marker device 109 based on GPS data, object detection data, mapping data, and/or combination thereof, etc., and the marker position of the marker device 109 may need to satisfy the position error threshold (e.g., less than 10 cm). In some embodiments, the marker position of the marker device 109 may be in the form of an absolute geographic location (e.g., GPS coordinates) or a relative geographic location relative to a predefined point of reference (e.g., the roadside unit 107, etc.). In some embodiments, the marker device manager 208 may also determine the context data associated with the marker device 109 using the geographical map of the road segment. As discussed elsewhere herein, the context data may describe the roadway portion of the road segment that is adjacent to the marker device 109 (e.g., roadway type, speed limit, lane number, lane attributes, etc.). Other implementations for determining the marker data of the marker device 109 are also possible and contemplated.

In some embodiments, for each marker device 109 among the plurality of marker devices 109, the writer interface 204 may write the marker data of the marker device 109 to the memory of that marker device 109 using the writer device. In some embodiments, the marker device manager 208 may transmit the marker data of the marker device 109 located on the road segment to the roadside unit 107 of the road segment, and the writer interface 204 of the vehicle localization application 120 implemented on the roadside unit 107 may write the marker data of the marker device 109 to the memory of that marker device 109 using the writer device of the roadside unit 107. Alternatively, the marker device manager 208 may transmit the marker data of the marker device 109 located on the road segment to the vehicle platform 103 traveling on the road segment, and the writer interface 204 of the vehicle localization application 120 implemented on the vehicle platform 103 may write the marker data of the marker device 109 to the memory of that marker device 109 using the writer device 127 of the vehicle platform 103. Other implementations for writing the marker data onto the marker devices 109 are also possible and contemplated.

Figure 7B:
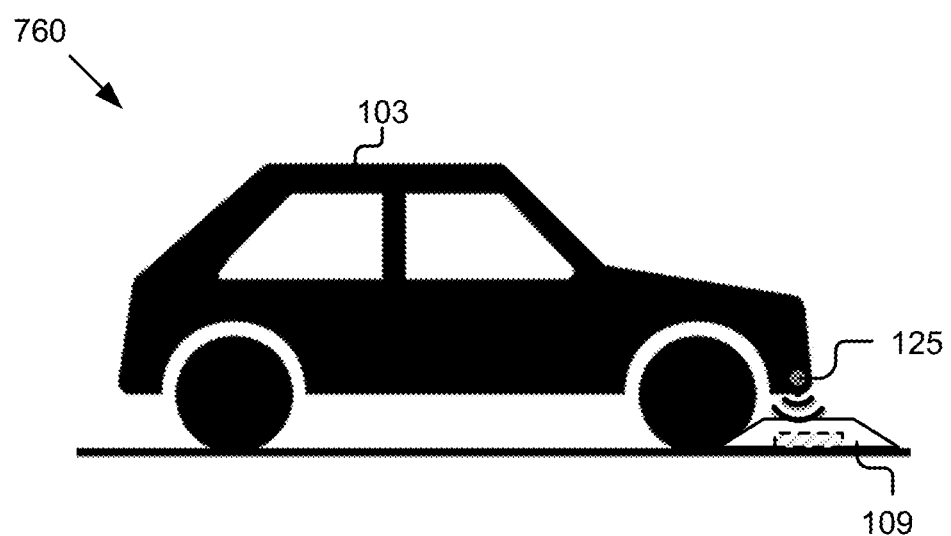
FIG. 7B illustrates an example read operation of a reader device.

In some embodiments, as the vehicle platform 103 travels along the road segment, the reader devices 125 of the vehicle platform 103 may perform one or more read operations to read one or more marker devices 109 located on the road segment. An example read operation of the reader device 125 is illustrated in FIG. 7B. As depicted, the reader device 125 mounted on the bottom of the vehicle platform 103 may continually transmit an electromagnetic signal within its sensing area towards the roadway surface of the road segment. If a marker device 109 is located on the road segment within the sensing area of the reader device 125 due to the vehicle position of the vehicle platform 103, the communication component of the marker device 109 may receive the electromagnetic signal of the reader device 125, and transmit the marker data of the marker device 109 stored in the memory of the marker device 109 to the reader device 125 in the form of a response signal. In some embodiments, the reader device 125 of the vehicle platform 103 may receive and process the response signal to extract the marker data of the marker device 109. The reader device 125 may also measure the signal strength of the response signal. In some embodiments, the reader device 125 may transmit the marker data of the marker device 109 and the signal strength of the response signal to the reader interface 202 of the vehicle localization application 120.

In some embodiments, the reader interface 202 may initiate reading cycles at a predefined interval (e.g., every 10 ms), each reading cycle may be associated with a reading timestamp. In some embodiments, the reading timestamp may be the timestamp at which the reading cycle starts, the timestamp at which the reading cycle ends, or any timestamp within the reading cycle. In some embodiments, as the reading cycle is initiated, the reader device 125 may initiate one or more read operations on one or more marker devices 109 that are currently located within the sensing area of the reader device 125, and transmit the marker data of the one or more marker devices 109 to the reader interface 202 as discussed above. As the reader interface 202 receives the marker data of the one or more marker devices 109 from the reader device 125, the reader interface 202 may determine that the one or more marker devices 109 were read by the reader device 125 during the reading cycle associated with the reading timestamp. The marker device 109 located within the sensing area of the reader device 125 and being read by the reader device 125 during the reading cycle associated with the reading timestamp may be considered as the marker device 109 located within the sensing area of the reader device 125 and being read by the reader device 125 at the reading timestamp.

In some embodiments, the reader interface 202 may generate the read data describing the one or more read operations performed by the reader device 125. For a read operation performed by the reader device 125 on a marker device 109, the read data may include the reader device ID of the reader device 125, the marker data of the marker device 109 obtained by the reader device 125, and the reading timestamp of the reading cycle. As discussed elsewhere herein, the marker data of the marker device 109 may include the marker ID of the marker device 109, the marker position at which the marker device 109 is located on the road segment, the context data describing the roadway portion of the road segment that is adjacent to the marker device 109, etc.

As discussed elsewhere herein, the vehicle platform 103 may include multiple reader devices 125 mounted on the vehicle platform 103 at their corresponding reader position. In some embodiments, the reader devices 125 may be mounted on the bottom of the vehicle platform 103 according to a reader placement pattern such that the sensing areas of the reader devices 125 collectively cover at least a portion of the perimeter of the occupied region of the vehicle platform 103 (e.g., 40% of the perimeter) and also cover at least a portion of the occupied region of the vehicle platform 103 within the perimeter. In some embodiments, the occupied region of the vehicle platform 103 may be the area that the vehicle platform 103 occupies, given its vehicle position.

In some embodiments, multiple reader devices 125 mounted on the vehicle platform 103 may initiate their reading operations at the same time as the reading cycle associated with the reading timestamp is initiated. As a result, multiple marker devices 109 that are located within the occupied region of the vehicle platform 103 at the reading timestamp may be simultaneously read by multiple reader devices 125 of the vehicle platform 103 during the reading cycle associated with the reading timestamp, and the vehicle position of the vehicle platform 103 at the reading timestamp may be determined based on the marker data obtained from these one or more marker devices 109. In some embodiments, the sensing areas of the reader devices 125 mounted on the vehicle platform 103 may overlap. If a marker device 109 on the road segment is located in the overlap portion of the sensing areas of two or more reader devices 125, the two or more reader devices 125 may each individually read the marker data of the marker device 109 from the marker device 109 located in the overlap portion.

Figure 8B:
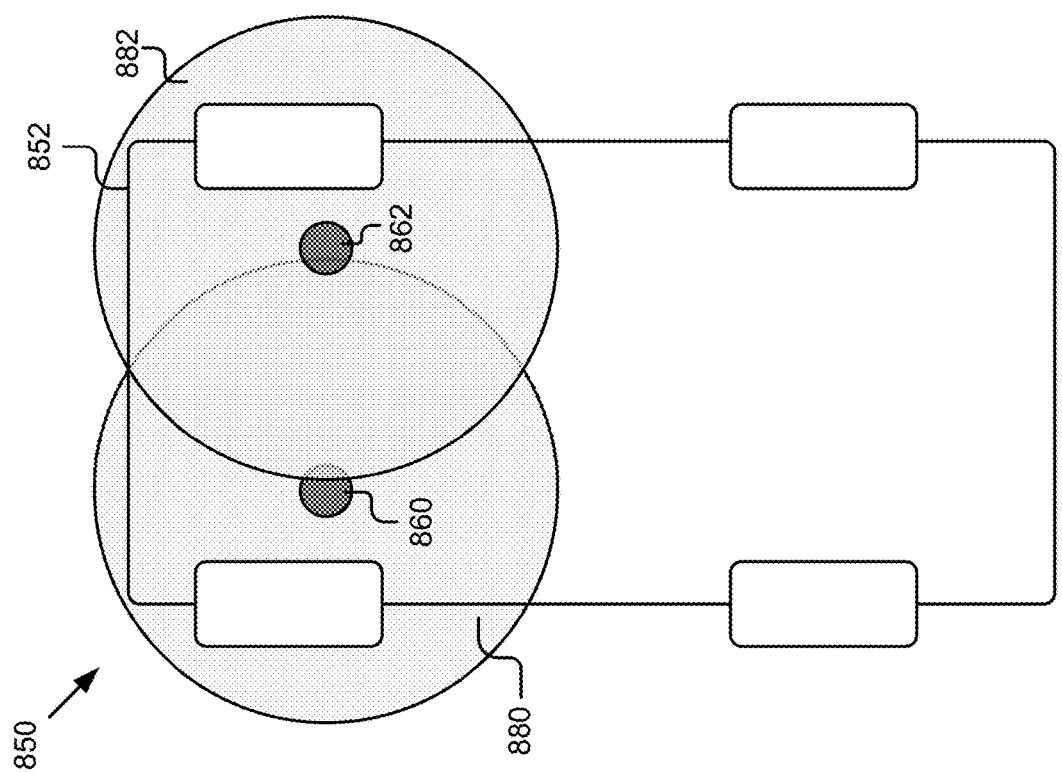
FIGS. 8A and 8B illustrate example reader placement patterns of the reader devices mounted on the vehicle.
Figure 8A:
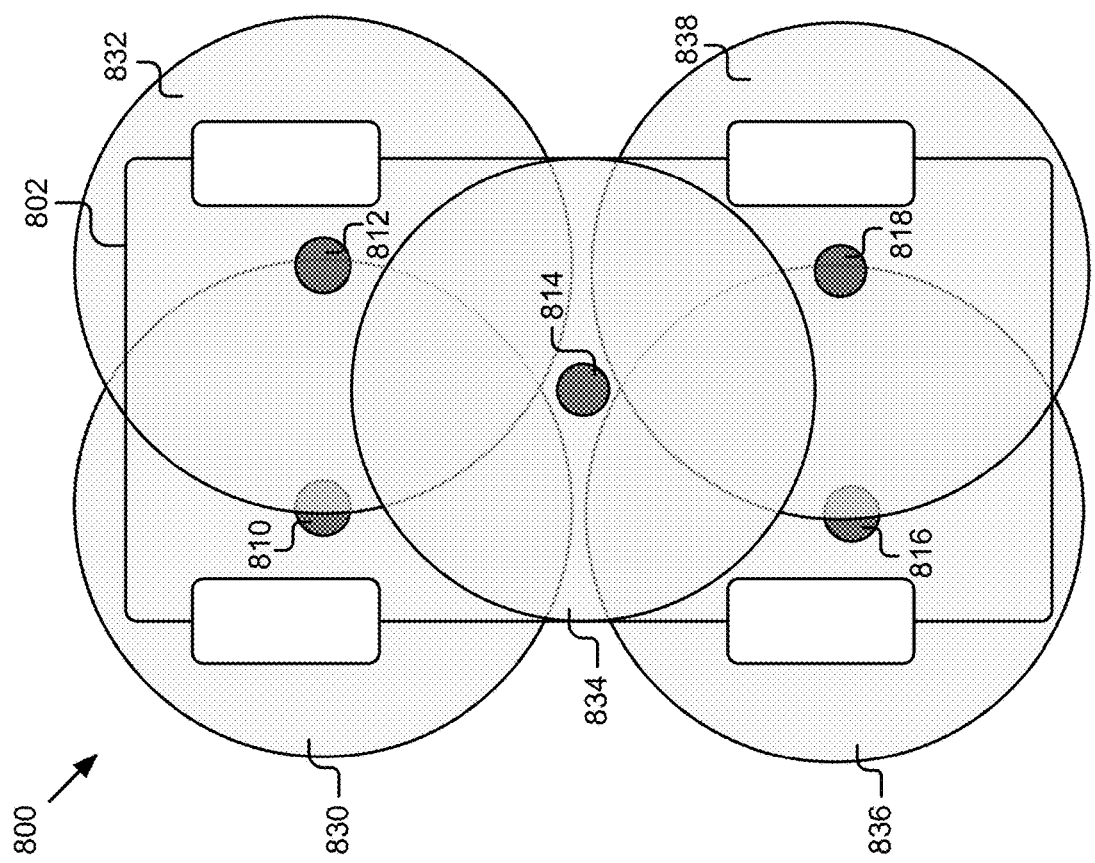

An example reader placement pattern 800 is illustrated in FIG. 8A. As depicted, the reader devices 810, 812, 814, 816, 818 may be mounted on the bottom of the vehicle platform 103 that occupies the occupied region 802. As shown, the occupied region 802 and the perimeter of the occupied region 802 may be entirely covered by the sensing areas 830, 832, 834, 836, 838 of the reader devices 810, 812, 814, 816, 818. In this example, the reader devices 810, 812, 814, 816, 818 may simultaneously read multiple marker devices 109 that are located within the sensing areas 830, 832, 834, 836, 838 at the reading timestamp, and the vehicle position of the vehicle platform 103 at the reading timestamp may be determined based on the marker data obtained from these one or more marker devices 109. Thus, in this example, the vehicle position of the vehicle platform 103 may be determined based on the marker devices 109 that are located within the occupied region 802 at the reading timestamp.

Another example reader placement pattern 850 is illustrated in FIG. 8B. As depicted, the reader devices 860 and 862 may be mounted at the front bottom of the vehicle platform 103 that occupies the occupied region 852. As shown, only a front portion of the occupied region 852 and a front portion of the perimeter of the occupied region 852 may be covered by the sensing areas 880 and 882 of the reader devices 860 and 862. Similar to the example depicted in FIG. 8A, the reader devices 860 and 862 may simultaneously read multiple marker devices 109 located within the sensing areas 880 and 882 at the reading timestamp, and the vehicle position of the vehicle platform 103 at the reading timestamp may be determined based on the marker data obtained from these one or more marker devices 109. Thus, in this example, the vehicle position of the vehicle platform 103 may be determined based on the marker devices 109 that are located within the front portion of the occupied region 852 at the reading timestamp.

As depicted in FIGS. 8A and 8B, the sensing areas of the reader devices 125 may cover at least a portion of the occupied region of the vehicle platform 103 at the front edge and the side edges of the occupied region. This implementation is advantageous because the reader devices 125 can perform the read operations on the marker devices 109 located within the occupied region of the vehicle platform 103 regardless of whether the vehicle platform 103 approaches the marker devices 109 from the front portion of the vehicle (e.g., as the vehicle platform 103 moves forward) or the side portion of the vehicle (e.g., as the vehicle platform 103 changes lane). In addition, as depicted in FIG. 8B, the reader devices 125 may be mounted only at the front bottom of the vehicle platform 103. This implementation is also advantageous because the reader devices 125 can perform the read operations on the marker devices 109 as soon as the marker devices 109 are located within the occupied region of the vehicle platform 103 as the vehicle platform 103 proceeds forward, and the total number of reader devices 109 mounted on the vehicle platform 103 can be reduced.

Figure 3:
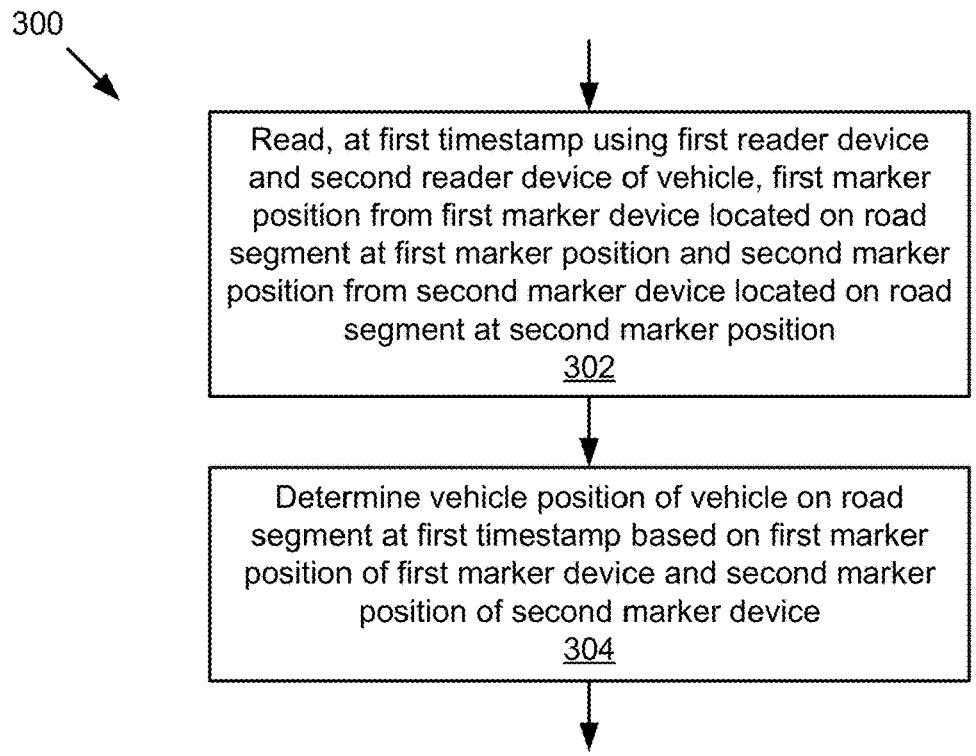
FIG. 3 is a flowchart of an example method for determining a vehicle position of a vehicle at a first timestamp.

FIG. 3 is a flowchart of an example method 300 for determining the vehicle position of the vehicle platform 103 at a first timestamp. In block 302, the vehicle platform 103 may read a first marker position from a first marker device 109 located on a road segment at the first marker position. The vehicle platform 103 may read the first marker device 109 at the first timestamp using a first reader device 125 of the vehicle platform 103. The vehicle platform 103 may also read a second marker position from a second marker device 109 located on the road segment at the second marker position that is different from the first marker position. The vehicle platform 103 may read the second marker device 109 at the first timestamp using a second reader device 125 of the vehicle platform 103.

In some embodiments, the first marker device 109 may be located within the sensing area of the first reader device 125 at the first timestamp, and the second marker device 109 may be located within the sensing area of the second reader device 125 at the first timestamp due to the vehicle position of the vehicle platform 103. Therefore, during the reading cycle associated with the first timestamp, the first reader device 125 may read the marker data of the first marker device 109 from the first marker device 109 located within its sensing area, and transmit the marker data of the first marker device 109 to the reader interface 202. Similarly, during the reading cycle associated with the first timestamp, the second reader device 125 may read the marker data of the second marker device 109 from the second marker device 109 located within its sensing area, and transmit the marker data of the second marker device 109 to the reader interface 202. In some embodiments, the reader interface 202 may analyze the marker data of the first marker device 109 obtained by the first reader device 125 to extract the first marker position of the first marker device 109, and analyze the marker data of the second marker device 109 obtained by the second reader device 125 to extract the second marker position of the second marker device 109.

In some embodiments, the first reader device 125 may also measure the signal strength of the first response signal that the first reader device 125 received from the first marker device 109, and transmit the signal strength of the first response signal to the reader interface 202. Similarly, the second reader device 125 may measure the signal strength of the second response signal that the second reader device 125 received from the second marker device 109, and transmit the signal strength of the second response signal to the reader interface 202. In some embodiments, the reader interface 202 may determine the first estimated distance between the first reader device 125 and the first marker device 109 based on the signal strength of the first response signal, and determine the second estimated distance between the second reader device 125 and the second marker device 109 based on the signal strength of the second response signal. In some embodiments, the estimated distance may be directly proportional to the signal strength of a corresponding response signal.

In block 304, the vehicle position processor 206 may determine the vehicle position of the vehicle platform 103 on the road segment at the first timestamp based on the first marker position of the first marker device 109 and the second marker position of the second marker device 109. As discussed above, the first marker device 109 and the second marker device 109 located on the road segment were read by the first reader device 125 and the second reader device 125 of the vehicle platform 103 at the first timestamp. In some embodiments, the vehicle position processor 206 may determine the vehicle position of the vehicle platform 103 relative to the first marker device 109 and the second marker device 109 on the road segment based on the first marker position of the first marker device 109, the first reader position and the first sensing area of the first reader device 125 that read the first marker device 109, the second marker position of the second marker device 109, and the second reader position and the second sensing area of the second reader device 125 that read the second marker device 109.

In some embodiments, the vehicle position processor 206 may determine one or more candidate vehicle positions of the vehicle platform 103 relative to the first marker device 109 and the second marker device 109. Each candidate vehicle position of the vehicle platform 103 may have the first marker device 109 lying within the first sensing area of the first reader device 125 that read the first marker device 109 and the second marker device 109 lying within the second sensing area of the second reader device 125 that read the second marker device 109, given the first reader position of the first reader device 125 and the second reader position of the second reader device 125 mounted on the vehicle platform 103. In some embodiments, the candidate vehicle position of the vehicle platform 103 may have the first marker device 109 lying within the first sensing area of the first reader device 125 at the first estimated distance from the first reader position of the first reader device 125, and the second marker device 109 lying within the second sensing area of the second reader device 125 at the second estimated distance from the second reader position of the second reader device 125. As discussed above, the first estimated distance may be determined based on the signal strength of the first response signal that the first reader device 125 received from the first marker device 109, and the second estimated distance may be determined based on the signal strength of the second response signal that the second reader device 125 received from the second marker device 109. Other implementations using various techniques (e.g., triangulation, maximal likelihood estimation, etc.) to determine the candidate vehicle position of the vehicle platform 103 based on the marker positions of the marker devices 109 being read are also possible and contemplated.

It should be understood that the first reader device 125 may read one or more first marker devices 109 and the second reader device 125 may read one or more second marker devices 109 at the first timestamp. In some embodiments, the vehicle position processor 206 may determine whether the first reader device 125 and the second reader device 125 both read a third marker device 109 at the first timestamp among the first marker devices 109 and the second marker devices 109. In some embodiments, the vehicle position processor 206 may determine the marker ID extracted from the marker data of the first marker devices 109 that matches the marker ID extracted from the marker data of the second marker devices 109, and determine the marker device 109 that has the matching marker ID to be the third marker device 109 being read by both the first reader device 125 and the second reader device 125 at the first timestamp. In some embodiments, the vehicle position processor 206 may determine one or more candidate vehicle positions of the vehicle platform 103 relative to the first marker devices 109 and the second marker devices 109 based on the marker positions of these marker devices 109 in the manner discussed above. As the third marker device 109 among these marker devices 109 was read by both the first reader device 125 and the second reader device 125, the candidate vehicle position of the vehicle platform 103 may have the third marker device 109 lying within the overlap portion between the first sensing area of the first reader device 125 and the second sensing area of the second reader device 125.

In some embodiments, the one more candidate vehicle positions of the vehicle platform 103 may form a position range, and the vehicle position processor 206 may select the vehicle position of the vehicle platform 103 relative to the first marker device 109 and the second marker device 109 from the position range. For example, the vehicle position processor 206 may select the candidate vehicle position in the middle of the position range to be the vehicle position of the vehicle platform 103 relative to the first marker device 109 and the second marker device 109. Alternatively, the vehicle position processor 206 may randomly select the vehicle position of the vehicle platform 103 relative to the first marker device 109 and the second marker device 109 from the position range.

Thus, as discussed above, the vehicle position processor 206 may determine the vehicle position of the vehicle platform 103 relative to the first marker device 109 and the second marker device 109 on the road segment based on the combination of at least the first marker position of the first marker device 109 and the second marker position of the second marker device 109. In some embodiments, if the number of marker devices 109 being read by the reader devices 125 of the vehicle platform 103 at the first timestamp increases, the number of candidate vehicle positions of the vehicle platform 103 that has each of these marker devices 109 lying within the sensing area of the corresponding reader device 125 may be limited, and thus the accuracy of the vehicle position of the vehicle platform 103 can be improved. In some embodiments, the marker devices 109 may be placed with relatively high placement density along the road segment on which the accurate vehicle positions of the vehicle platforms 103 are usually needed (e.g., tunnel, intersection, etc.). As a result, the reader devices 125 of the vehicle platform 103 may likely read multiple marker devices 109 on the road segment at the same timestamp, and thus the accurate vehicle position of the vehicle platform 103 on the road segment can be determined based on the combination of the marker positions of these multiple marker devices 109 as discussed above.

Figure 5:
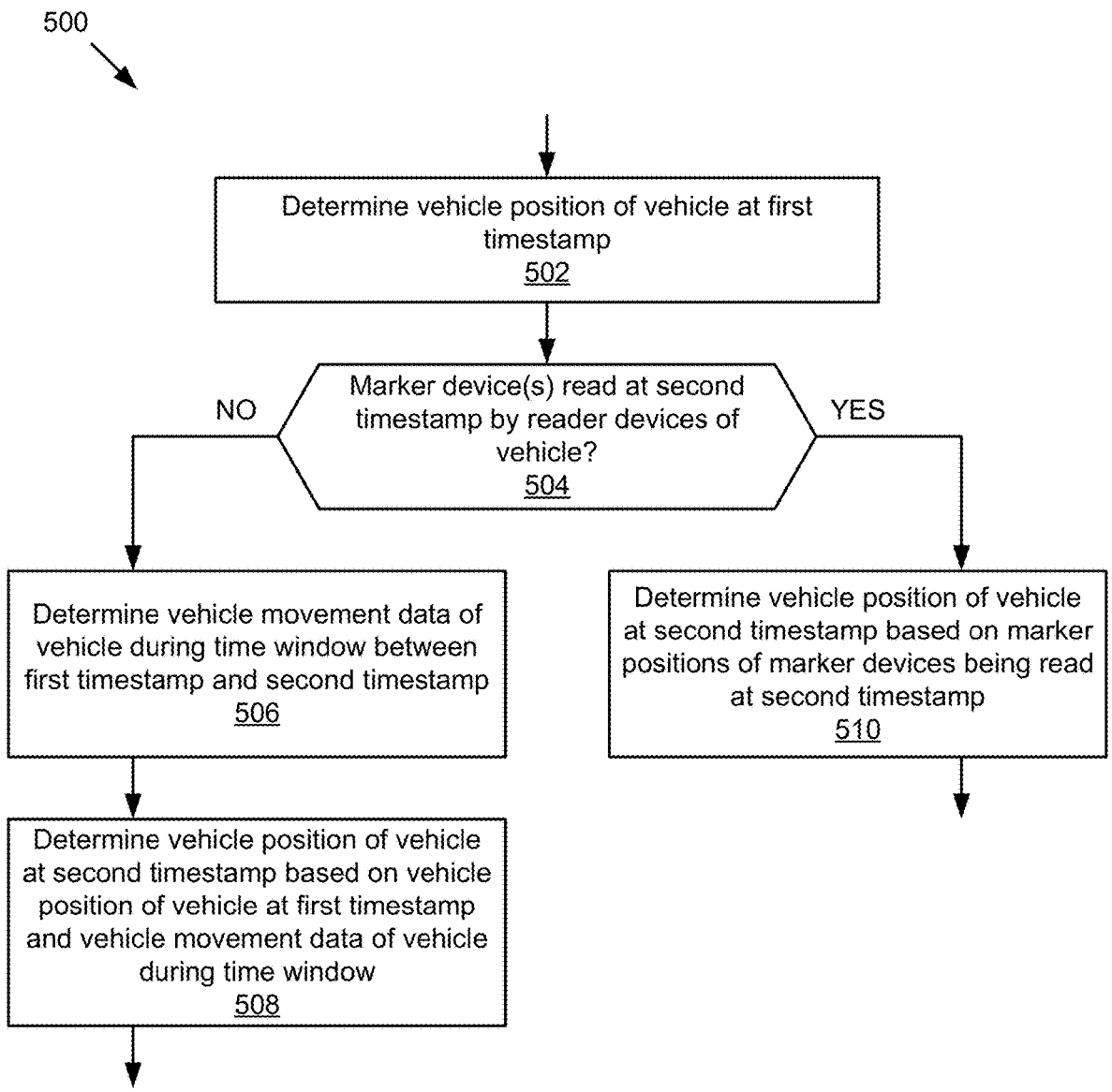
FIG. 5 is a flowchart of an example method for determining a vehicle position of the vehicle at a second timestamp.

As discussed elsewhere herein, the reader interface 202 may initiate the reading cycles at a predefined interval (e.g., every 10 ms). During these reading cycles, the reader devices 125 of the vehicle platform 103 may continually read the marker devices 109 located within their sensing areas as the vehicle platform 103 proceeds along the road segment, and the vehicle position processor 206 may continually determine the vehicle position of the vehicle platform 103 on the road segment based on the marker positions of the marker devices 109 being read. FIG. 5 is a flowchart of an example method 500 for determining the vehicle position of the vehicle platform 103 at a second timestamp subsequent to a first timestamp. In block 502, the vehicle position processor 206 may determine the vehicle position of the vehicle platform 103 at the first timestamp. As discussed above with reference to FIG. 3, the vehicle position processor 206 may determine the vehicle position of the vehicle platform 103 on the road segment at the first timestamp based on at least two marker positions of at least two marker devices 109 that were read by the reader devices 125 of the vehicle platform 103 at the first timestamp.

In block 504, the vehicle position processor 206 may determine whether a marker device 109 was read or not at the second timestamp by the reader devices 125 of the vehicle platform 103. If in block 504, the vehicle position processor 206 determines that the reader devices 125 of the vehicle platform 103 did not read any marker device 109 at the second timestamp, the method 500 proceeds to block 506. In block 506, the vehicle position processor 206 may determine the vehicle movement data of the vehicle platform 103 during the time window between the first timestamp and the second timestamp. In some embodiments, the vehicle position processor 206 may retrieve the vehicle movement data of the vehicle platform 103 from the vehicle data store 121. The vehicle movement data of the vehicle platform 103 may indicate the vehicle route, the vehicle speed, the vehicle acceleration/deceleration rate, the vehicle orientation, the steering angle, the moving direction, etc., of the vehicle platform 103 during the time window.

In block 508, the vehicle position processor 206 may determine the vehicle position of the vehicle platform 103 at the second timestamp based on the vehicle position of the vehicle platform 103 at the first timestamp and the vehicle movement data of the vehicle platform 103 during the time window. In some embodiments, the vehicle position processor 206 may compute the travel distance that the vehicle platform 103 traveled during the time window based on the vehicle speed and/or the vehicle acceleration/deceleration rate of the vehicle platform 103 (e.g., 15 m). The vehicle position processor 206 may then determine the vehicle position of the vehicle platform 103 at the second timestamp based on the vehicle position of the vehicle platform 103 at the first timestamp and the travel distance (e.g., 15 m), the moving direction (e.g., east-south), the steering angle (e.g., 30°), etc., of the vehicle platform 103 during the time window. In some embodiments, the vehicle position of the vehicle platform 103 at the first timestamp may be determined based on the marker position of the marker devices 109 that were read most recently prior to the second timestamp. Thus, even if no marker device 109 was read at the second timestamp, the vehicle position of the vehicle platform 103 at the second timestamp can still be determined based on the marker position of the marker devices 109 being read recently. This implementation is advantageous because the vehicle platform 103 can frequently determine its vehicle position on the road segment even if the road segment has the marker devices 109 embedded with low placement density.

If in block 504, the vehicle position processor 206 determines that the reader devices 125 of the vehicle platform 103 read one or more marker devices 109 at the second timestamp, the method 500 proceeds to block 510. In block 510, the vehicle position processor 206 may determine the vehicle position of the vehicle platform 103 at the second timestamp based on the marker positions of the one or more marker devices 109 that were read at the second timestamp by the reader devices 125 of the vehicle platform 103. In some embodiments, the vehicle position processor 206 may determine the vehicle position of the vehicle platform 103 at the second timestamp in a manner similar to determining the vehicle position of the vehicle platform 103 at the first timestamp as discussed above with reference to FIG. 3.

As discussed above, the vehicle position processor 206 may determine the vehicle position of the vehicle platform 103 at multiple timestamps associated with multiple reading cycles as the vehicle platform 103 proceeds along the road segment (e.g., every 10 ms). As the reader devices 125 may read the marker devices 109 located on the road segment and the vehicle position processor 206 may determine the vehicle position of the vehicle platform 103 relative to the marker devices 109 being read, the vehicle position of the vehicle platform 103 can be determined with low latency and high accuracy in real-time, and thus the vehicle position of the vehicle platform 103 can be used for various critical vehicle applications.

As an example, to avoid a potential collision between a first vehicle platform 103 and other vehicle platforms 103 located proximate to one another on the road segment, the collision avoidance application 122 implemented on the first vehicle platform 103 may receive the vehicle position of the first vehicle platform 103 and the vehicle positions of the other vehicle platforms 103 from the vehicle localization applications 120 implemented on these vehicle platforms 103. The collision avoidance application 122 may receive the vehicle positions of these vehicle platforms 103 at a predefined interval (e.g., every 50 ms). In some embodiments, the collision avoidance application 122 may determine the likelihood of collision between the first vehicle platform 103 and the other vehicle platforms 103 based on their vehicle positions, and determine adaptive vehicle movements for the first vehicle platform 103 to avoid the potential collision with the other vehicle platforms 103. In some embodiments, the collision avoidance application 122 may generate driving instructions to avoid the potential collision (e.g., suggesting slowing down or making a lane change), and provide the driving instructions to the driver of the first vehicle platform 103 via one or more output devices of the first vehicle platform 103. In some embodiments, the collision avoidance application 122 may communicate movement instructions to the control units of the first vehicle platform 103 (e.g., the ECU) to control one or more speed actuators, steering actuators, etc., of the first vehicle platform 103, thereby automatically adjusting the vehicle movement of the first vehicle platform 103 to avoid the potential collision.

As another example, to form a vehicle platoon in which each vehicle platform 103 maintains a predefined distance relative to the proximate vehicle platforms 103 located directly proximate to it, the vehicle platoon application implemented on a first vehicle platform 103 may receive the vehicle position of the first vehicle platform 103 and the vehicle positions of the proximate vehicle platforms 103 from the vehicle localization applications 120 implemented on these vehicle platforms 103. The vehicle platoon application may receive the vehicle positions of these vehicle platforms 103 at a predefined interval (e.g., every 100 ms). In some embodiments, the vehicle platoon application may determine corrective vehicle movements for the first vehicle platform 103 to maintain the predefined distance relative to the proximate vehicle platforms 103 based on the vehicle positions of these vehicle platforms 103 (e.g., increasing the vehicle speed by 5 mph). In some embodiments, the vehicle platoon application may communicate movement instructions to the control units of the first vehicle platform 103 (e.g., the ECU) to control one or more speed actuators, steering actuators, etc., of the first vehicle platform 103, thereby automatically adjusting the vehicle movement of the first vehicle platform 103 to maintain the relative position of the first vehicle platform 103 in the vehicle platoon.

As another example, to generate a dynamic 3-dimensional (3D) model describing the road scene of the road segment, the road scene modeling application may receive the vehicle position of the multiple vehicle platforms 103 located on the road segments from the vehicle localization applications 120 implemented on these vehicle platforms 103. The road scene modeling application may receive the vehicle positions of these vehicle platforms 103 at a predefined interval (e.g., every 10 ms). In addition to the vehicle position, the road scene modeling application may also receive the appearance data describing the vehicle appearance (e.g., shape, size, color, etc.), and the sensor data collected by the vehicle sensors of these vehicle platforms 103. In some embodiments, the road scene modeling application may analyze the vehicle positions, the appearance data, and the sensor data of the vehicle platforms 103, and generate the dynamic 3D model that describes the vehicle platforms 103 and other roadway objects present in the road scene with a high level of detail. As discussed above, the vehicle localization applications 120 may frequently determine the accurate vehicle positions of the vehicle platforms 103 as the vehicle platforms 103 proceed along the road segment. As a result, the dynamic 3D model generated based on the vehicle positions of the vehicle platforms 103 and the sensor data collected at these vehicle positions is highly accurate and can be updated in real-time. In some embodiments, the dynamic 3D model describing the road scene of the road segment can be used in autonomous driving vehicles. For example, the autonomous driving vehicles may rely on this dynamic 3D model to navigate through the road segment without human control. Other vehicle applications that use the vehicle position of the vehicle platform 103 determined by the vehicle localization application 120 to perform their operations are also possible and contemplated.

Figure 4:
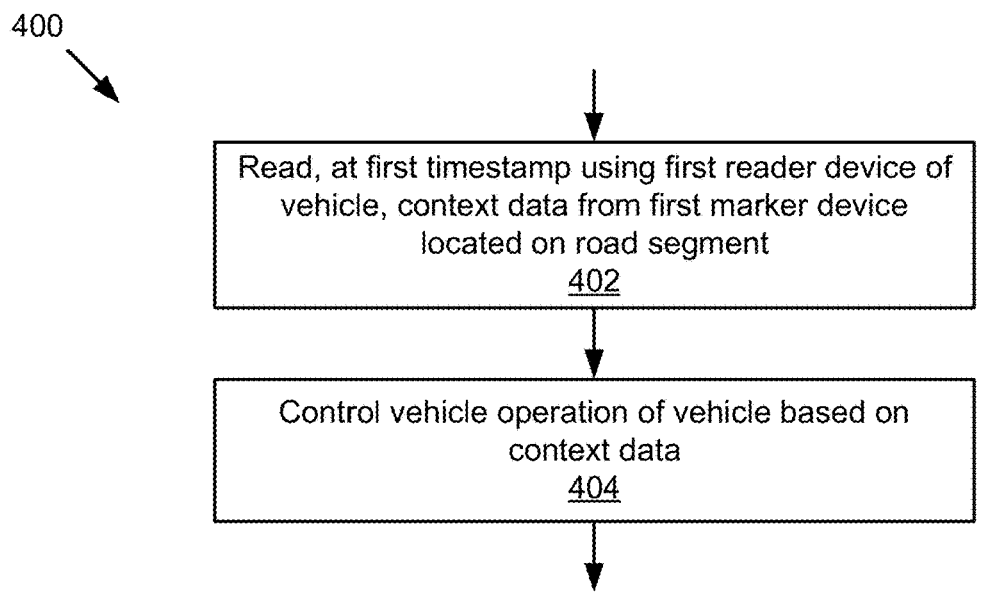
FIG. 4 is a flowchart of an example method for controlling vehicle operation of the vehicle based on context data.

In many driving situations, adverse driving conditions may cause limited vision to the driver. For example, the driver may not be able to see traffic signs or road markings when driving in a snowstorm or in a tunnel. In those driving situations, the context data being read from the marker device 109 located on the roadway surface of the road segment can be used to inform the driver about the roadway attributes of the road segment and/or to control the vehicle operation of the vehicle platform 103. FIG. 4 is a flowchart of an example method 400 for controlling vehicle operation of the vehicle platform 103 based on the context data. In block 402, the vehicle platform 103 may read the context data from the marker device 109 located on the road segment using the reader device 125 of the vehicle platform 103. As discussed elsewhere herein, the reader device 125 may read the marker data of the marker device 109 from the marker device 109 located within its sensing area, and transmit the marker data of the marker device 109 to the reader interface 202. In some embodiments, the reader interface 202 may analyze the marker data of the marker device 109 obtained by the reader device 125, and extract the marker position of the marker device 109 and the context data associated with the marker device 109. In some embodiments, the context data associated with the marker device 109 may describe the roadway portion of the road segment that is adjacent to the marker device 109. The roadway portion may be the portion of the road segment that is within a predefined distance from the marker position of the marker device 109 (e.g., 5 m).

In some embodiments, the context data associated with the marker device 109 may include one or more roadway attributes describing the roadway portion of the road segment adjacent to the marker device 109. The roadway attributes of the roadway portion may include the roadway type of the roadway portion (e.g., tunnel, overpass, underpass, etc.), the speed limit of the roadway portion (e.g., 50 mph), the roadway type of the upcoming roadway portion that follows the roadway portion (e.g., tunnel, sharp turn area, intersection, etc.), etc. In some embodiments, the roadway attributes of the roadway portion may also include the lane number and the lane attributes (e.g., carpool lane, no turn on red light, lane ends ahead, etc.) of one or more traffic lanes associated with the marker device 109. The traffic lane associated with the marker device 109 may have the marker device 109 located on or within its lane boundaries. Other types of context data are also possible and contemplated.

In block 404, the vehicle platform 103 may control vehicle operations of the vehicle platform 103 based on the roadway attributes of the roadway portion of the road segment. In some embodiments, the reader interface 202 may transmit the roadway attributes of the roadway portion extracted from the context data to the control units of the vehicle platform 103 (e.g., the ECU), and the control units of the vehicle platform 103 may adjust the vehicle operations of the vehicle platform 103 accordingly. Non-limiting examples of the vehicle operations being adjusted based on the context data include, but are not limited to, path planning operation, vehicle light adjustment, vehicle speed adjustment, steering angle adjustment, etc.

As an example, the roadway attributes of the roadway portion may indicate that the traffic lane associated with the marker device 109 is closing ahead. In this example, the control units of the vehicle platform 103 may adjust the path plan of the vehicle platform 103 to include a lane change performance when there is sufficient space in the neighboring lane. As another example, the roadway attributes of the roadway portion may indicate that the upcoming roadway portion is in the tunnel with the speed limit of 25 mph. In this example, the control units of the vehicle platform 103 may automatically turn on the headlights and control one or more speed actuators of the vehicle platform 103 to adjust the vehicle speed of the vehicle platform 103 to the speed limit. As another example, the control units of the vehicle platform 103 may provide the roadway attributes of the roadway portion (e.g., lane number, speed limit, etc.) to the driver via one or more output devices of the vehicle platform 103. Thus, the driver may be informed of these roadway attributes of the roadway portion to perform the driving operation even in the adverse driving conditions that cause limited vision to the driver.

In some embodiments, the context data associated with the marker device 109 may change over time. For example, the lane may now allow turns from it and the lane attributes of the traffic lane associated with the marker device 109 may be updated to reflect such. In some embodiments, the marker device manager 208 may update the context data (including the attributes for that lane) stored in the marker device 109. For example, the marker device manager 208 may replace the context data with the update context data in the memory of the marker device 109 using the writer device. In some embodiments, the marker device manager 208 may transmit the update context data of the marker device 109 to the roadside unit 107 of the road segment on which the marker device 109 is located, and the writer interface 204 of the vehicle localization application 120 implemented on the roadside unit 107 may overwrite the context data of the marker device 109 in the memory of that marker device 109 with the update context data using the writer device of the roadside unit 107. Alternatively, the marker device manager 208 may transmit the update context data of the marker device 109 to the vehicle platform 103 traveling on the road segment, and the writer interface 204 of the vehicle localization application 120 implemented on the vehicle platform 103 may overwrite the context data of the marker device 109 in the memory of that marker device 109 with the update context data using the writer device 127 of the vehicle platform 103. In some embodiments, the marker device manager 208 may also update the marker position of the marker device 109 in the memory of that marker device 109 when needed in a similar manner.

In some embodiments, a large number of marker devices 109 may be embedded along the road segment, and thus it is challenging to identify the marker devices 109 that are inoperable to repair or replace among the large number of marker devices 109. In some embodiments, to identify the inoperable marker devices 109 on the road segment, the vehicle localization application 120 implemented on the vehicle platform 103 may generate detection data at a predefined interval as the vehicle platform 103 travels along the road segment (e.g., every 2 minutes), and transmit the detection data to the vehicle localization application 120 implemented on the server 101 and/or the roadside unit 107. The detection data may specify the road segment along which the vehicle platform 103 traveled during a time window, a set of marker devices 109 that were read by the reader devices 125 of the vehicle platform 103 over the time window, the reading timestamp at which each marker device 109 in the set of marker devices 109 was read, etc. Other types of detection data are also possible and contemplated.

In some embodiments, the vehicle localization application 120 implemented on the server 101 and/or the roadside unit 107 may determine inoperable marker devices 109 among the marker devices 109 located on the road segment based on the detection data received from a plurality of vehicle platforms 103 traveling on the road segment. In some embodiments, the marker device manager 208 may analyze the detection data received from the plurality of vehicle platforms 103, and determine that a first marker device 109 is not included in the detection data of the plurality of vehicle platforms 103, while a second marker device 109 located proximate to the first marker device 109 on the road segment is included in the detection data of the plurality of vehicle platforms 103. Accordingly, the marker device manager 208 may determine that the first marker device 109 was unread by the reader devices 125 of the plurality of vehicle platforms 103, while the second marker device 109 located proximate to the first marker device 109 on the road segment was read by the reader devices 125 of the plurality of vehicle platforms 103. The marker device manager 208 may therefore determine that the first marker device 109 was faulty.

Figure 6A:
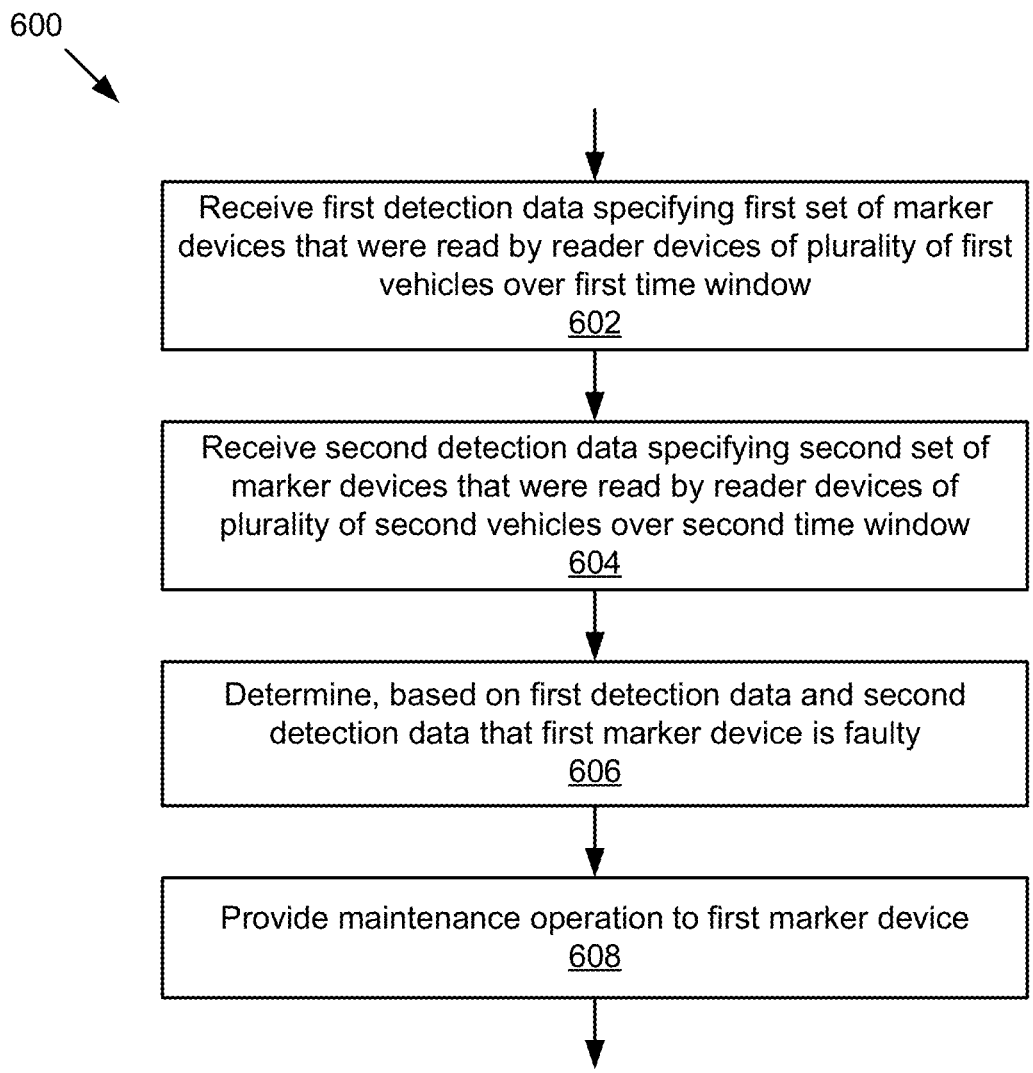
FIGS. 6A-6D are flowcharts of example methods for determining a faulty marker device.

FIG. 6A is a flowchart of example method 600 for determining a faulty marker device 109. In block 602, the marker device manager 208 may receive first detection data specifying a first set of marker devices 109 among the plurality of marker devices 109 located on the road segment. As discussed above, the marker device manager 208 may receive the first detection data from a plurality of first vehicles 103 that traveled on the road segment during a first time window, and the first detection data may include the marker device IDs specifying the marker devices 109 of the first set that were read by the reader devices 125 of the plurality of first vehicles 103 over the first time window. In block 604, the marker device manager 208 may receive second detection data specifying a second set of marker devices 109 among the plurality of marker devices 109 located on the road segment. Similarly, the marker device manager 208 may receive the second detection data from a plurality of second vehicles 103 that traveled on the road segment during a second time window, and the second detection data may include the marker device IDs specifying the second set of marker devices 109 that were read by the reader devices 125 of the plurality of second vehicles 103 over the second time window. In some embodiments, the first time window may be corresponding to the second time window and prior to the first time window. For example, the first time window may have the same start timestamp and end timestamp as the second time window (e.g., from 14:00:00 to 14:02:00) but on a previous day.

In block 606, the marker device manager 208 may determine that a first marker device 109 among the plurality of marker devices 109 located on the road segment is faulty based on the first detection data specifying the first set of marker devices 109 and the second detection data specifying the second set of marker devices 109. The first marker device 109 may be located proximate to a second marker device 109 that is included in one or more of the first set of marker devices 109 and the second set of marker devices 109.

Figure 6B:
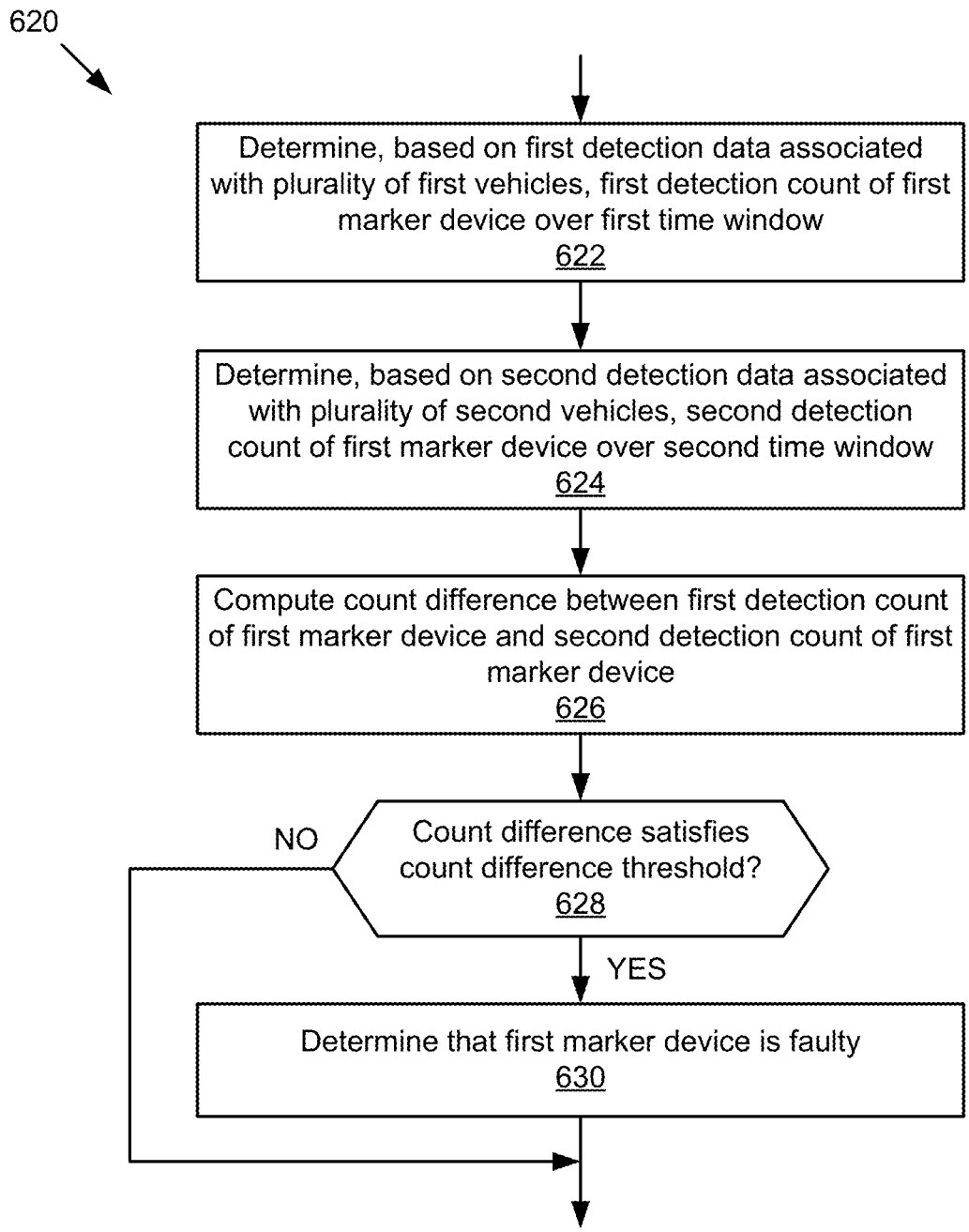

FIG. 6B is a flowchart of example method 620 for determining whether the first marker device 109 is faulty based on the first detection data and the second detection data. In block 622, the marker device manager 208 may determine a first detection count of the first marker device 109 over the first time window based on the first detection data associated with the plurality of first vehicles 103. As discussed above, the first detection data may specify the first set of marker devices 109 that were read over the first time window by the reader devices 125 of the plurality of first vehicles 103 as the plurality of first vehicles 103 traveled along the road segment during the first time window. In some embodiments, the first detection count of the first marker device 109 may indicate the number of times that the first marker device 109 was read over the first time window by the reader devices 125 of the plurality of first vehicles 103 (e.g., 3387 times).

In block 624, the marker device manager 208 may determine a second detection count of the first marker device 109 over the second time window based on the second detection data associated with the plurality of second vehicles 103. As discussed above, the second detection data may specify the second set of marker devices 109 that were read over the second time window by the reader devices 125 of the plurality of second vehicles 103 as the plurality of second vehicles 103 traveled along the road segment during the second time window. In some embodiments, the second detection count of the first marker device 109 may indicate the number of times that the first marker device 109 was read over the second time window by the reader devices 125 of the plurality of second vehicles 103 (e.g., 511 times).

In block 626, the marker device manager 208 may compute a count difference between the first detection count of the first marker device 109 over the first time window and the second detection count of the first marker device 109 over the second time window (e.g., 2876 times). In block 628, the marker device manager 208 may determine whether the count difference between the first detection count of the first marker device 109 over the first time window and the second detection count of the first marker device 109 over the second time window satisfies a count difference threshold (e.g., more than 750 times). If the count difference between the first detection count of the first marker device 109 over the first time window and the second detection count of the first marker device 109 over the second time window satisfies the count difference threshold, in block 630, the marker device manager 208 may determine that the first marker device 109 is faulty. Thus, if the number of times that the first marker device 109 was read over the second time window is significantly lower than the number of times that the first marker device 109 was read over the first time window corresponding to the second time window and prior to the second time window, the marker device manager 208 may determine that the first marker device 109 is faulty. This implementation is advantageously applicable to determine the faulty marker devices 109 on busy road segment along which a large number of vehicle platforms 103 usually travel and generate their detection data for the road segment.

Figure 6C:
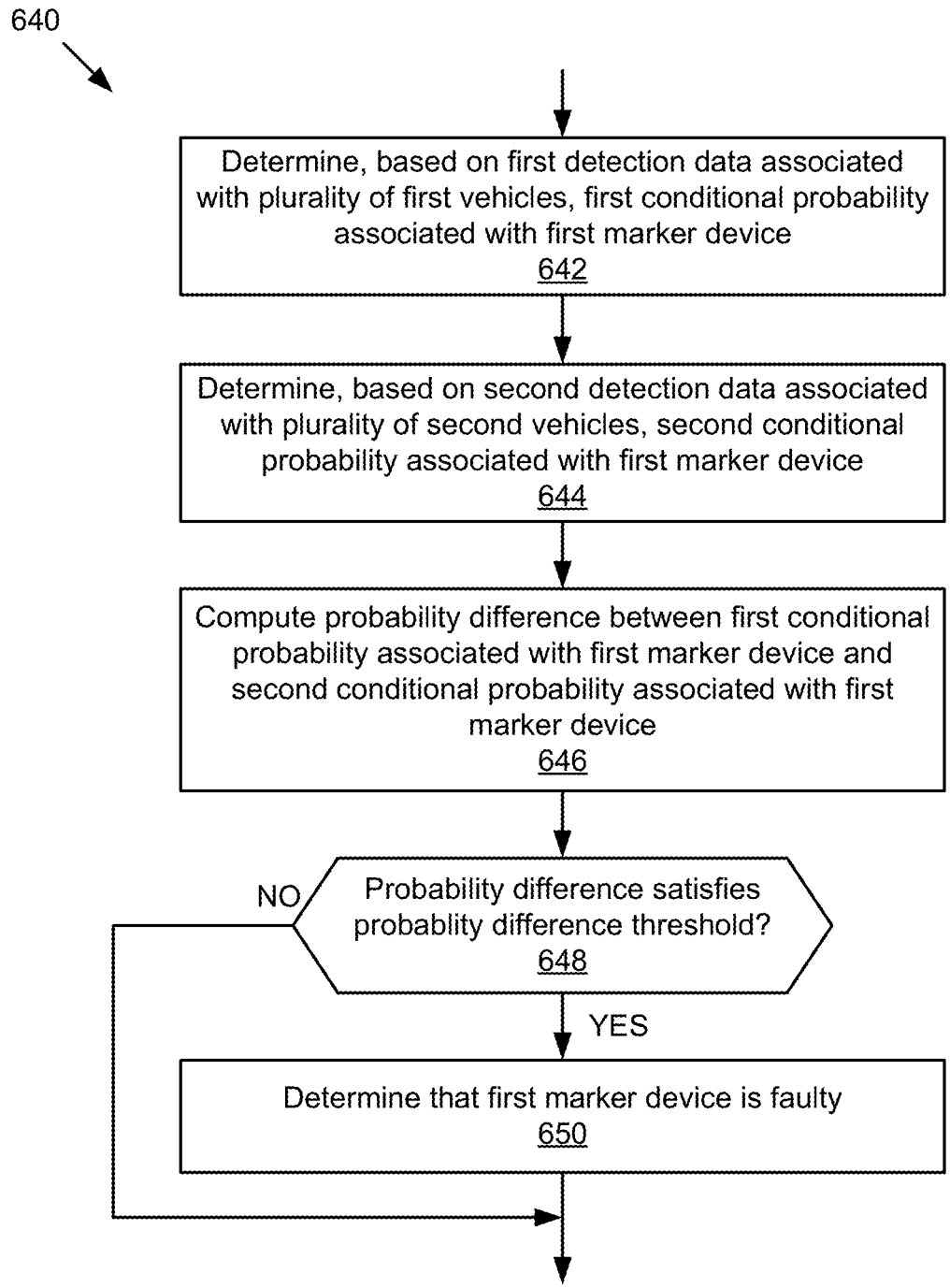

FIG. 6C is a flowchart of another example method 640 for determining whether the first marker device 109 is faulty based on the first detection data and the second detection data. In block 642, the marker device manager 208 may determine a first conditional probability associated with the first marker device 109 based on the first detection data associated with the plurality of first vehicles 103. As discussed above, the first detection data may specify the first set of marker devices 109 that were read over the first time window by the reader devices 125 of the plurality of first vehicles 103 as the plurality of first vehicles 103 traveled along the road segment during the first time window. In some embodiments, the first conditional probability associated with the first marker device 109 may indicate a probability that the first marker device 109 was read by the reader devices 125 of a first vehicle platform 103 among this plurality of first vehicle platforms 103, given that one or more proximate marker devices 109 located proximate to the first marker device 109 on the road segment were read by the reader devices 125 of the same first vehicle platform 103. In some embodiments, the proximate marker device 109 located proximate to the first marker device 109 may have the distance between the proximate marker device 109 and the first marker device 109 satisfying a proximate distance threshold (e.g., less than 3 m). The proximate marker device 109 may be the second marker device 109 located proximate to the first marker device 109 and included in the marker devices 109 of the first set that were read by the reader devices 125 of the plurality of first vehicles 103 over the first time window. It should be understood that the first marker device 109 and the one or more proximate marker devices 109 may or may not be in the same traffic lane.

As an example, as depicted in FIG. 9A, the marker devices 920, 922, 924, 926 may be located proximate to one another on the road segment 900. In this example, the marker device manager 208 may analyze the first detection data generated over the first time window by the plurality of first vehicles 103 traveling along the road segment 900 during the first time window, and determine the first conditional probability associated with the marker device 922. The first conditional probability associated with the marker device 922 may indicate the probability that the marker device 922 was read by the reader devices 125 of a first vehicle platform 103 among the plurality of first vehicles 103, given that the marker devices 920, 924, 926 were read by the reader devices 125 of the same first vehicle platform 103. In this example, the marker device manager 208 may determine the first conditional probability associated with the marker device 922 to be 96%. Thus, if the reader devices 125 of the first vehicle platform 103 read the marker devices 920, 924, 926, the reader devices 125 of the first vehicle platform 103 may likely also read the marker device 922.

In this example, the marker device manager 208 may also determine the first conditional probability associated with the marker device 926. The first conditional probability associated with the marker device 926 may indicate the probability that the marker device 926 was read by the reader devices 125 of the first vehicle platform 103, given that the marker devices 920, 922, 924 were read by the reader devices 125 of the same first vehicle platform 103. In this example, the marker device manager 208 may determine the first conditional probability associated with the marker device 926 to be 65%. Thus, if the reader devices 125 of the first vehicle platform 103 read the marker devices 920, 922, 924, the reader devices 125 of the first vehicle platform 103 may or may not read the marker device 926.

In block 644, the marker device manager 208 may determine a second conditional probability associated with the first marker device 109 based on the second detection data associated with the plurality of second vehicles 103. As discussed above, the second detection data may specify the second set of marker devices 109 that were read over the second time window by the reader devices 125 of the plurality of second vehicles 103 as the plurality of second vehicles 103 traveled along the road segment during the second time window. In some embodiments, the second conditional probability associated with the first marker device 109 may indicate a probability that the first marker device 109 was read by the reader devices 125 of a second vehicle platform 103 among this plurality of second vehicle platforms 103, given that the one or more proximate marker devices 109 were read by the reader devices 125 of the same second vehicle platform 103. The one or more proximate marker devices 109 being used to determine the second conditional probability associated with the first marker device 109 may be the same as the one or more proximate marker devices 109 being used to determine first conditional probability associated with the first marker device 109. The proximate marker device 109 may be the second marker device 109 located proximate to the first marker device 109 and included in the marker devices 109 of the second set that were read by the reader devices 125 of the plurality of second vehicles 103 over the second time window.

Continuing the above example, the marker device manager 208 may analyze the second detection data generated over the second time window by the plurality of second vehicles 103 traveling along the road segment 900 during the second time window, and determine the second conditional probability associated with the marker device 922. The second conditional probability associated with the marker device 922 may indicate the probability that the marker device 922 was read by the reader devices 125 of a second vehicle platform 103 among the plurality of second vehicles 103, given that the marker devices 920, 924, 926 were read by the reader devices 125 of the same second vehicle platform 103. In this example, the marker device manager 208 may determine the second conditional probability associated with the marker device 922 to be 20%.

In block 646, the marker device manager 208 may compute a probability difference between the first conditional probability associated with the first marker device 109 and the second conditional probability associated with the first marker device 109 (e.g., 76%). In block 648, the marker device manager 208 may determine whether the probability difference between the first conditional probability associated with the first marker device 109 and the second conditional probability associated with the first marker device 109 satisfies a probability difference threshold (e.g., more than 40%). If the probability difference between the first conditional probability associated with the first marker device 109 and the second conditional probability associated with the first marker device 109 satisfies the probability difference threshold, in block 650, the marker device manager 208 may determine that the first marker device 109 is faulty. Thus, if the conditional probability that the first marker device 109 was read given that its proximate marker devices 109 were read by the same second vehicle platform 103 traveling on the road segment during the second time window is significantly lower than the conditional probability that the first marker device 109 was read given that its proximate marker devices 109 were read by the same first vehicle platform 103 traveling on the road segment during the first time window, the marker device manager 208 may determine that the first marker device 109 is faulty. As discussed elsewhere herein, the first time window may be corresponding to the second time window and prior to the second time window. This implementation is advantageously applicable to determine the faulty marker devices 109 on the road segment along which only a limited number of vehicle platforms 103 usually travel and generate their detection data for the road segment.

In some embodiments, instead of relying on the historical detection data generated by the vehicle platforms 103 traveling on the road segment in the past (e.g., the first detection data generated by the plurality of first vehicles 103), the marker device manager 208 may use simulated detection data to determine the failure marker devices 109 on the road segment. In some embodiments, the marker device manager 208 may generate a simulated road segment simulating the traffic condition of the road segment based on various traffic condition metrics associated with the road segment (e.g., traffic flow, average vehicle speed, average following distance, etc.). The marker device manager 208 may then generate simulated detection data associated with a plurality of simulated vehicles traveling on the simulated road segment during a simulated time window. In some embodiments, the simulated detection data may include the marker device IDs specifying marker devices 109 that were read by the reader devices of the plurality of simulated vehicles over the simulated time window. In some embodiments, the simulated time window may be corresponding to the second time window. For example, the simulated time window may have the same start timestamp and end timestamp as the second time window (e.g., from 14:00:00 to 14:02:00).

In some embodiments, the marker device manager 208 may determine that the first marker device 109 located on the road segment is faulty based on the simulated detection data and the second detection data. The marker device manager 208 may determine that the first marker device 109 is faulty based on the simulated detection data and the second detection data in a manner similar to determining that the first marker device 109 is faulty based on the first detection data and the second detection data as discussed above with reference to FIGS. 6B and 6C. For example, the marker device manager 208 may determine a first detection count of the first marker device 109 over the simulated time window based on the simulated detection data associated with the plurality of simulated vehicles. The marker device manager 208 may determine a second detection count of the first marker device 109 over the second time window based on the second detection data associated with the plurality of second vehicles 103. The marker device manager 208 may compute a count difference between the first detection count of the first marker device 109 over the simulated time window and the second detection count of the first marker device 109 over the second time window, and determine if the count difference satisfies the count difference threshold (e.g., more than 750 times). If the count difference satisfies the count difference threshold, the marker device manager 208 may determine that the first marker device 109 is faulty. Thus, if the number of times that the first marker device 109 was read over the second time window is significantly lower than the number of times that the first marker device 109 was read over the simulated time window corresponding to the second time window, the marker device manager 208 may determine that the first marker device 109 is faulty.

Figure 6D:
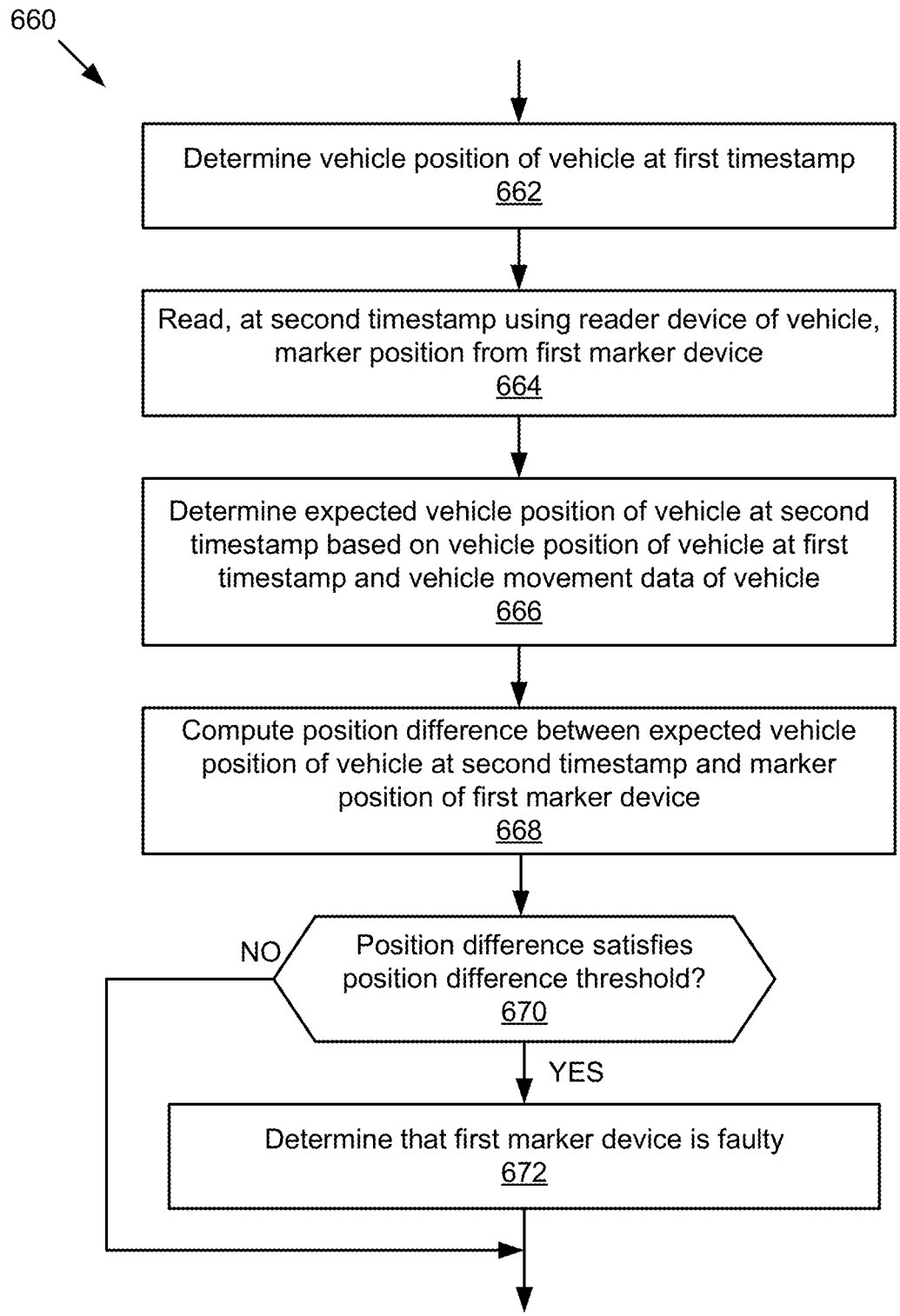

FIG. 6D is a flowchart of example method 660 for determining whether the first marker device 109 is faulty based on the read data and the vehicle movement data of the vehicle platform 103. In block 662, the vehicle position processor 206 may determine the vehicle position of the vehicle platform 103 on the road segment at the first timestamp. As discussed above with reference to FIG. 3, the vehicle position processor 206 may determine the vehicle position of the vehicle platform 103 at the first timestamp based on at least two marker positions of at least two marker devices 109 that were read by the reader devices 125 of the vehicle platform 103 at the first timestamp. In block 664, the vehicle platform 103 may read the first marker position from the first marker device 109 located on the road segment at the first marker position. The vehicle platform 103 may read the first marker device 109 at a second timestamp subsequent to the first timestamp using the reader device 125 of the vehicle platform 103.

In block 666, the vehicle position processor 206 may determine an expected vehicle position of the vehicle platform 103 at the second timestamp based on the vehicle position of the vehicle platform 103 at the first timestamp and the vehicle movement data of the vehicle platform 103 during the time window between the first timestamp and the second timestamp. In some embodiments, the vehicle position processor 206 may determine the expected vehicle position of the vehicle platform 103 at the second timestamp in a manner similar to determining the vehicle position of the vehicle platform 103 at the second timestamp as discussed above with reference to block 506 and block 508 in FIG. 5.

In block 668, the marker device manager 208 may compute a position difference between the expected vehicle position of the vehicle platform 103 at the second timestamp and the first marker position of the first marker device 109 that was read at the second timestamp by the reader device 125 of the vehicle platform 103 (e.g., 5.2 m). In block 670, the marker device manager 208 may determine whether the position difference between the expected vehicle position of the vehicle platform 103 at the second timestamp and the first marker position of the first marker device 109 read at the second timestamp by the reader device 125 of the vehicle platform 103 satisfies a position difference threshold (e.g., more than 4.5 m). If the position difference between the expected vehicle position of the vehicle platform 103 at the second timestamp and the first marker position of the first marker device 109 read at the second timestamp by the reader device 125 of the vehicle platform 103 satisfies the position difference threshold, in block 672, the marker device manager 208 may determine that the first marker device 109 is faulty. Thus, if the marker position of the marker device 109 that was read at the second timestamp by the vehicle platform 103 is significantly different from the expected vehicle position of the vehicle platform 103 at the second timestamp, the marker device manager 208 may determine that the first marker device 109 is faulty. This implementation is advantageously applicable to determine the faulty marker devices 109 that are still readable by the reader devices of the vehicle platforms 103 but displaced from their original marker positions on the road segment.

In some embodiments, once the marker device manager 208 determines that the first marker device 109 is faulty, the marker device manager 208 may additionally re-determine whether the first marker device 109 is faulty using different set of detection data, read data, and/or vehicle movement data associated with other vehicle platforms 103 in one or more manners discussed above with reference to FIGS. 6B-6D, thereby verifying that the first marker device 109 is actually faulty. It should be understood that the determination of the faulty marker devices 109 on the road segment as discussed above can be performed by the vehicle localization application 120 implemented on the vehicle platform 103 and/or by the vehicle localization application 120 implemented on the server 101 and/or the roadside unit 107.

Referring back to FIG. 6A, once the marker device manager 208 determines that the first marker device 109 is faulty, in block 608, the marker device manager 208 may provide maintenance operation to the first marker device 109. In some embodiments, the marker device manager 208 may rewrite the marker data stored in the memory of the first marker device 109, update a marker repair list to include the marker ID and/or the marker position of the first marker device 109, schedule a repair session for a maintenance worker to repair or replace the first marker device 109, etc. In some embodiments, the maintenance worker may replace the storage unit 706 of the first marker device 109 with a new storage unit 706 that stores the marker data of the first marker device 109, etc. Other maintenance operations are also possible and contemplated.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   reading, at a first timestamp using a first reader device and a second reader device of a first vehicle, a first marker position from a first marker device located on a road segment at the first marker position and a second marker position from a second marker device located on the road segment at the second marker position that is different from the first marker position;
   determining a vehicle position of the first vehicle on the road segment at the first timestamp based on the first marker position of the first marker device and the second marker position of the second marker device;
   responsive to determining that no marker device was read by one or more of the first reader device and the second reader device of the first vehicle at a second timestamp, determining vehicle movement data of the first vehicle during a time window between the first timestamp and the second timestamp, the second timestamp being subsequent to the first timestamp; and
   determining a vehicle position of the first vehicle at the second timestamp based on the vehicle position of the first vehicle at the first timestamp and the vehicle movement data of the first vehicle during the time window.

2. The method of claim 1, wherein determining the vehicle position of the first vehicle on the road segment at the first timestamp includes:
   determining, based on a combination of at least the first marker position of the first marker device and the second marker position of the second marker device, the vehicle position of the first vehicle relative to the first marker device and the second marker device on the road segment.

3. The method of claim 1, wherein determining the vehicle position of the first vehicle on the road segment at the first timestamp includes:
   determining the vehicle position of the first vehicle relative to the first marker device and the second marker device on the road segment based on the first marker position of the first marker device, a first reader position of the first reader device that read the first marker device, the second marker position of the second marker device, and a second reader position of the second reader device that read the second marker device.

4. The method of claim 1, further comprising:
   reading, using the first reader device of the first vehicle, context data from the first marker device, the context data including one or more roadway attributes of a roadway portion of the road segment that is adjacent to the first marker device; and
   controlling, using a control unit of the first vehicle, a vehicle operation of the first vehicle based on the one or more roadway attributes of the roadway portion of the road segment.

5. The method of claim 4, wherein:
   the one or more roadway attributes of the roadway portion of the road segment include
     one or more of
     a roadway type of the roadway portion,
     a speed limit of the roadway portion,
     a lane number and one or more lane attributes of one or more traffic lanes associated with the first marker device in the roadway portion, and
     a roadway type of an upcoming roadway portion that follows the roadway portion; and
   the vehicle operation of the first vehicle includes one or more of a path planning operation, a vehicle light adjustment, a vehicle speed adjustment, and a steering angle adjustment of the first vehicle.

6. The method of claim 1, further comprising:
   updating, using a writer device of the first vehicle, one or more of the first marker position of the first marker device and context data stored in the first marker device.

7. The method of claim 1, wherein a first sensing area of the first reader device overlaps with a second sensing area of the second reader device.

8. The method of claim 1, further comprising:
receiving detection data specifying a set of marker devices among a plurality of marker devices located on the road segment, the set of marker devices being read by reader devices of a plurality of vehicles over a second time window;
determining, based on the detection data, that a third marker device among the plurality of marker devices was unread by the reader devices of the plurality of vehicles, the third marker device being located proximate to a fourth marker device included in the set of marker devices; and
determining that the third marker device is faulty.

9. A system comprising:
one or more processors; and
one or more memories storing instructions that, when executed by the one or more processors, cause the system to:
read, at a first timestamp using a first reader device and a second reader device of a first vehicle, a first marker position from a first marker device located on a road segment at the first marker position and a second marker position from a second marker device located on the road segment at the second marker position that is different from the first marker position;
determine a vehicle position of the first vehicle on the road segment at the first timestamp based on the first marker position of the first marker device and the second marker position of the second marker device;
determine that no marker device was read at a second timestamp by the first reader device and the second reader device of the first vehicle, the second timestamp being subsequent to the first timestamp;
responsive to determining that no marker device was read by the first reader device and the second reader device of the first vehicle at the second timestamp, determine vehicle movement data of the first vehicle during a time window between the first timestamp and the second timestamp; and
determine a vehicle position of the first vehicle at the second timestamp based on the vehicle position of the first vehicle at the first timestamp and the vehicle movement data of the first vehicle during the time window.

10. The system of claim 9, wherein to determine the vehicle position of the first vehicle on the road segment at the first timestamp includes:
determining, based on a combination of at least the first marker position of the first marker device and the second marker position of the second marker device, the vehicle position of the first vehicle relative to the first marker device and the second marker device on the road segment.

11. The system of claim 9, wherein to determine the vehicle position of the first vehicle on the road segment at the first timestamp includes:
determining the vehicle position of the first vehicle relative to the first marker device and the second marker device on the road segment based on the first marker position of the first marker device, a first reader position of the first reader device that read the first marker device, the second marker position of the second marker device, and a second reader position of the second reader device that read the second marker device.

12. The system of claim 9, wherein the instructions, when executed by the one or more processors, further cause the system to:
read, using the first reader device of the first vehicle, context data from the first marker device, the context data including one or more roadway attributes of a roadway portion of the road segment that is adjacent to the first marker device; and
control, using a control unit of the first vehicle, a vehicle operation of the first vehicle based on the one or more roadway attributes of the roadway portion of the road segment.

13. The system of claim 12, wherein:
the one or more roadway attributes of the roadway portion of the road segment include
one or more of
a roadway type of the roadway portion,
a speed limit of the roadway portion,
a lane number and one or more lane attributes of one or more traffic lanes associated with the first marker device in the roadway portion, and
a roadway type of an upcoming roadway portion that follows the roadway portion; and
the vehicle operation of the first vehicle includes one or more of a path planning operation, a vehicle light adjustment, a vehicle speed adjustment, and a steering angle adjustment of the first vehicle.

14. The system of claim 9, wherein the instructions, when executed by the one or more processors, further cause the system to:
update, using a writer device of the first vehicle, one or more of the first marker position of the first marker device and context data stored in the first marker device.

15. The system of claim 9, wherein a first sensing area of the first reader device overlaps with a second sensing area of the second reader device.

16. The system of claim 9, wherein the instructions, when executed by the one or more processors, further cause the system to:
receive detection data specifying a set of marker devices among a plurality of marker devices located on the road segment, the set of marker devices being read by reader devices of a plurality of vehicles over a second time window;
determine, based on the detection data, that a third marker device among the plurality of marker devices was unread by the reader devices of the plurality of vehicles, the third marker device being located proximate to a fourth marker device included in the set of marker devices; and
determine that the third marker device is faulty.

17. A method comprising:
receiving first detection data specifying a first set of marker devices among a plurality of marker devices located on a road segment, the first set of marker devices being read by reader devices of a plurality of first vehicles over a first time window;
receiving second detection data specifying a second set of marker devices among the plurality of marker devices, the second set of marker devices being read by reader devices of a plurality of second vehicles over a second time window;

determining, based on the first detection data and the second detection data, that a first marker device among the plurality of marker devices is faulty, the first marker device being located proximate to a second marker device included in one or more of the first set of marker devices and the second set of marker devices, wherein determining that the first marker device is faulty includes:
- determining, based on the first detection data associated with the plurality of first vehicles, a first detection count of the first marker device over the first time window;
- determining, based on the second detection data associated with the plurality of second vehicles, a second detection count of the first marker device over the second time window;
- determining that a count difference between the first detection count of the first marker device over the first time window and the second detection count of the first marker device over the second time window satisfies a count difference threshold; and
- responsive to determining that the count difference between the first detection count of the first marker device over the first time window and the second detection count of the first marker device over the second time window satisfies the count difference threshold, determining that the first marker device is faulty; and providing a maintenance operation to the first marker device.

18. A method comprising:
receiving first detection data specifying a first set of marker devices among a plurality of marker devices located on a road segment, the first set of marker devices being read by reader devices of a plurality of first vehicles over a first time window;
receiving second detection data specifying a second set of marker devices among the plurality of marker devices, the second set of marker devices being read by reader devices of a plurality of second vehicles over a second time window;
determining, based on the first detection data and the second detection data, that a first marker device among the plurality of marker devices is faulty, the first marker device being located proximate to a second marker device included in one or more of the first set of marker devices and the second set of marker devices, wherein determining that the first marker device is faulty includes:
- determining, based on the first detection data associated with the plurality of first vehicles, a first conditional probability associated with the first marker device;
- determining, based on the second detection data associated with the plurality of second vehicles, a second conditional probability associated with the first marker device;
- determining that a probability difference between the first conditional probability associated with the first marker device and the second conditional probability associated with the first marker device satisfies a probability difference threshold; and
- responsive to determining that the probability difference between the first conditional probability associated with the first marker device and the second conditional probability associated with the first marker device satisfies the probability difference threshold, determining that the first marker device is faulty; and providing a maintenance operation to the first marker device.

19. The method of claim 18, wherein:
the first conditional probability associated with the first marker device indicates a probability that the first marker device was read by reader devices of a first vehicle among the plurality of first vehicles given that one or more proximate marker devices located proximate to the first marker device on the road segment were read by the reader devices of the first vehicle, the one or more proximate marker devices including the second marker device; and
the second conditional probability associated with the first marker device indicates a probability that the first marker device was read by reader devices of a second vehicle among the plurality of second vehicles given that the one or more proximate marker devices were read by the reader devices of the second vehicle.

20. A method comprising:
receiving first detection data specifying a first set of marker devices among a plurality of marker devices located on a road segment, the first set of marker devices being read by reader devices of a plurality of first vehicles over a first time window;
receiving second detection data specifying a second set of marker devices among the plurality of marker devices, the second set of marker devices being read by reader devices of a plurality of second vehicles over a second time window;
generating a simulated road segment simulating a traffic condition of the road segment;
generating simulated detection data using the simulated road segment;
determining, based on the first detection data and the second detection data, that a first marker device among the plurality of marker devices is faulty, the first marker device being located proximate to a second marker device included in one or more of the first set of marker devices and the second set of marker devices, wherein determining that the first marker device located on the road segment is faulty is based on the simulated detection data and the second detection data associated with the plurality of second vehicles; and
providing a maintenance operation to the first marker device.

21. A method comprising:
receiving first detection data specifying a first set of marker devices among a plurality of marker devices located on a road segment, the first set of marker devices being read by reader devices of a plurality of first vehicles over a first time window;
receiving second detection data specifying a second set of marker devices among the plurality of marker devices, the second set of marker devices being read by reader devices of a plurality of second vehicles over a second time window;
determining a vehicle position of a third vehicle on the road segment at a first timestamp;
reading, at a second timestamp using a reader device of the third vehicle, a marker position from a first marker device located on the road segment;
determining an expected vehicle position of the third vehicle at the second timestamp based on the vehicle position of the third vehicle at the first timestamp and vehicle movement data of the third vehicle during a time window between the first timestamp and the second timestamp;

determining that a position difference between the expected vehicle position of the third vehicle at the second timestamp and the marker position of the first marker device being read at the second timestamp by the reader device of the third vehicle satisfies a position difference threshold;

determining, based on the first detection data and the second detection data, that the first marker device among the plurality of marker devices is faulty, the first marker device being located proximate to a second marker device included in one or more of the first set of marker devices and the second set of marker devices, wherein determining that the first marker device is faulty includes:

responsive to determining that the position difference between the expected vehicle position of the third vehicle at the second timestamp and the marker position of the first marker device being read at the second timestamp by the reader device of the third vehicle satisfies the position difference threshold, determining that the first marker device is faulty; and providing a maintenance operation to the first marker device.

22. A method comprising:

determining an accident risk metric of each of multiple road segments;

determining a placement density of a plurality of marker devices along a first road segment of the multiple road segments based on the accident risk metric of the first road segment, the first road segment having a different placement density than a second road segment of the multiple road segments;

embedding the plurality of marker devices along the first road segment based on the placement density of the first road segment;

determining a marker position on the first road segment for each marker device among the plurality of marker devices;

writing, using a writer device, the marker position of each marker device among the plurality of marker devices to a non-transitory memory of that marker device;

reading, using one or more reader devices of a vehicle, at least two marker positions from at least two marker devices among the plurality of marker devices; and determining a vehicle position of the vehicle on the first road segment based on the at least two marker positions of the at least two marker devices among the plurality of marker devices.

23. The method of claim 22, wherein embedding the plurality of marker devices along the first road segment includes:

embedding a first set of marker devices within a first lane of the first road segment and a second set of marker devices within a second lane of the first road segment; and embedding a third set of marker devices on a lane boundary between the first lane and the second lane.

24. The method of claim 22, wherein the first road segment includes one or more of a tunnel road segment, an underpass road segment, a curvy road segment, and an intersection area.

25. The method of claim 22, wherein the first road segment includes a curvy road segment and the second road segment includes an intersection area, the first road segment including a first placement density and the second road segment having a second placement density different than the first placement density.

* * * * *